US012356139B2

(12) United States Patent
Gahimer et al.

(10) Patent No.: US 12,356,139 B2
(45) Date of Patent: Jul. 8, 2025

(54) SPEAKER DEVICE

(71) Applicant: SimpliSafe, Inc., Boston, MA (US)

(72) Inventors: Curtis Gahimer, Indianapolis, IN (US); Devin Walker, Somerville, MA (US); Rodrigo Alexei Vasquez, Medford, MA (US)

(73) Assignee: SimpliSafe, Inc., Boston, MA (US)

( * ) Notice: Subject to any disclaimer, the term of this patent is extended or adjusted under 35 U.S.C. 154(b) by 124 days.

(21) Appl. No.: 17/935,972

(22) Filed: Sep. 28, 2022

(65) Prior Publication Data

US 2024/0107223 A1 Mar. 28, 2024

(51) Int. Cl.
*H04R 1/28* (2006.01)
*G08B 3/10* (2006.01)
*H04R 31/00* (2006.01)

(52) U.S. Cl.
CPC ............. *H04R 1/2807* (2013.01); *G08B 3/10* (2013.01); *H04R 31/00* (2013.01)

(58) Field of Classification Search
CPC . H04R 1/025; H04R 1/02; H04R 9/18; H04R 1/2807; H04R 31/00; G08B 3/10
USPC .......................... 381/322, 338, 386, 340, 353
See application file for complete search history.

(56) References Cited

U.S. PATENT DOCUMENTS 3,778,551 A * 12/1973 Grodinsky ............. H05K 7/209 381/397
3,819,879 A 6/1974 Baechtold
4,239,945 A 12/1980 Atoji et al.
4,349,083 A * 9/1982 Bennett .................. H04R 25/48 181/135
4,698,619 A * 10/1987 Loeb ........................ G08B 3/10 331/51
5,729,605 A 3/1998 Bobisuthi et al.
5,844,998 A 12/1998 Nageno
6,473,625 B1 10/2002 Williams et al.
D640,721 S 6/2011 Satine
(Continued)

FOREIGN PATENT DOCUMENTS

DE 2261122 A1 6/1973
EM 002055954-0003 S 6/2012
(Continued)

OTHER PUBLICATIONS

Kuhnen, Leila; International Search Report and Written Opinion of the International Searching Authority dated Mar. 12, 2024; International Application No. PCT/US2023/033201 European Patent Office; Rijswijk, Netherlands.
(Continued)

*Primary Examiner* — Norman Yu
(74) *Attorney, Agent, or Firm* — Stevens & Showalter LLP

(57) ABSTRACT

A device including a speaker and a housing, in which the speaker is configured to generate sound and includes a diaphragm and the housing encloses the speaker and includes a plurality of openings within one portion of the housing. The speaker is positioned within the housing to define a front chamber between the diaphragm and the one portion, and the plurality of openings are sized to collectively generate, with the front chamber, an increased output of the device within a frequency range of an output of the speaker corresponding to an alarm tone. Also provided are methods for assembling a device including a speaker and a housing.

13 Claims, 15 Drawing Sheets

(56) References Cited

U.S. PATENT DOCUMENTS

| | | | | |
|---|---|---|---|---|
| 8,130,994 | B2 | 3/2012 | Button et al. | |
| 9,027,701 | B2 | 5/2015 | Center et al. | |
| 9,143,847 | B2 | 9/2015 | Dodd | |
| 9,154,869 | B2 | 10/2015 | Cohen | |
| 9,347,798 | B1 | 5/2016 | Johnson et al. | |
| 9,485,477 | B2 | 11/2016 | DiPoala | |
| 9,485,565 | B2 | 11/2016 | Lee et al. | |
| 9,628,900 | B2 | 4/2017 | Yang et al. | |
| 9,666,046 | B2 | 5/2017 | Lim | |
| D807,944 | S | 1/2018 | Worthington et al. | |
| 9,967,657 | B1 | 5/2018 | Wang | |
| 10,003,870 | B2 | 6/2018 | Miao | |
| D831,089 | S | 10/2018 | Laffon de Mazieres et al. | |
| 10,104,469 | B2 | 10/2018 | Jakowski | |
| 10,178,467 | B2 | 1/2019 | Hou et al. | |
| D842,358 | S | 3/2019 | Puric et al. | |
| D845,373 | S | 4/2019 | Mittleman et al. | |
| D849,080 | S | 5/2019 | Rosenberg et al. | |
| D849,088 | S | 5/2019 | Lai | |
| 10,299,030 | B2 | 5/2019 | Zhong | |
| 10,299,032 | B2 | 5/2019 | Grazian et al. | |
| 10,310,567 | B2 | 6/2019 | Kita et al. | |
| 10,348,351 | B2 | 7/2019 | Rivera | |
| 10,362,389 | B2 | 7/2019 | Proni et al. | |
| 10,418,955 | B2 | 9/2019 | D'Penha et al. | |
| 10,462,553 | B2 | 10/2019 | Matsumura | |
| 10,469,953 | B2 | 11/2019 | Qin et al. | |
| 10,484,766 | B2 | 11/2019 | Huo et al. | |
| 10,490,041 | B1 | 11/2019 | Churak | |
| D871,483 | S | 12/2019 | Chang et al. | |
| 10,529,206 | B2 | 1/2020 | Sacre et al. | |
| D886,177 | S | 6/2020 | Ramones et al. | |
| 10,718,996 | B2 | 7/2020 | Ramones et al. | |
| 10,728,638 | B2 | 7/2020 | Leonhardt et al. | |
| D892,663 | S | 8/2020 | Han et al. | |
| D902,978 | S | 11/2020 | England et al. | |
| 10,863,268 | B1 | 12/2020 | Torigoe et al. | |
| 10,893,174 | B2 | 1/2021 | Li et al. | |
| D912,122 | S | 3/2021 | McManigal et al. | |
| 10,950,212 | B1 | 3/2021 | Mathur | |
| D917,597 | S | 4/2021 | Park | |
| 11,064,621 | B1 | 7/2021 | Churak | |
| 11,076,229 | B2 | 7/2021 | Park et al. | |
| D926,857 | S | 8/2021 | Zhang | |
| 11,195,398 | B1 | 12/2021 | Fu et al. | |
| 11,228,832 | B2 | 1/2022 | Sim et al. | |
| 11,265,632 | B1 | 3/2022 | Au et al. | |
| 11,317,183 | B2 | 4/2022 | Shen et al. | |
| 11,317,195 | B2 | 4/2022 | Ma et al. | |
| 11,330,364 | B1 | 5/2022 | Delay et al. | |
| D954,124 | S | 6/2022 | Long | |
| D961,650 | S | 8/2022 | Kim et al. | |
| D962,322 | S | 8/2022 | Kim et al. | |
| D970,582 | S | 11/2022 | Thorne et al. | |
| D970,590 | S | 11/2022 | Thorne et al. | |
| D971,289 | S | 11/2022 | Thorne et al. | |
| 11,490,190 | B1 | 11/2022 | Leonhardt et al. | |
| D972,618 | S | 12/2022 | Li | |
| D973,123 | S | 12/2022 | Thorne et al. | |
| D973,748 | S | 12/2022 | Cai et al. | |
| D974,442 | S | 1/2023 | Li | |
| D974,446 | S | 1/2023 | Yang | |
| D976,984 | S | 1/2023 | McManigal et al. | |
| 11,589,143 | B2 | 2/2023 | Yang et al. | |
| D984,510 | S | 4/2023 | Li | |
| D986,310 | S | 5/2023 | Ma | |
| D986,936 | S | 5/2023 | Zhang | |
| D996,489 | S | 8/2023 | McManigal et al. | |
| 11,893,878 | B1 * | 2/2024 | Burau | G08B 27/00 |
| 2004/0084244 | A1 | 5/2004 | Zurek et al. | |
| 2007/0280497 | A1 * | 12/2007 | Isberg | H04R 1/2842 381/345 |
| 2010/0061584 | A1 * | 3/2010 | Lin | H04R 17/00 381/386 |
| 2012/0288107 | A1 | 11/2012 | Lamm et al. | |
| 2013/0170688 | A1 | 7/2013 | Cohen et al. | |
| 2014/0016813 | A1 * | 1/2014 | Morris | G08B 3/10 381/394 |
| 2015/0181322 | A1 | 6/2015 | Huang | |
| 2015/0382090 | A1 | 12/2015 | Bisset et al. | |
| 2016/0232759 | A1 | 8/2016 | Morris | |
| 2016/0343227 | A1 | 11/2016 | Shih et al. | |
| 2017/0070813 | A1 * | 3/2017 | Wah | H04M 1/035 |
| 2018/0317020 | A1 | 11/2018 | Abe et al. | |
| 2021/0278880 | A1 | 9/2021 | Chang et al. | |
| 2021/0306772 | A1 | 9/2021 | Wiss | |
| 2021/0356104 | A1 | 11/2021 | Thorne et al. | |
| 2022/0232304 | A1 | 7/2022 | Au et al. | |
| 2022/0264220 | A1 | 8/2022 | Kato et al. | |
| 2022/0301532 | A1 | 9/2022 | Ott | |
| 2023/0116758 | A1 | 4/2023 | Wu et al. | |

FOREIGN PATENT DOCUMENTS

| | | | |
|---|---|---|---|
| EM | 003119940-0002 | S | 5/2016 |
| EM | 008715957-0002 | S | 10/2021 |
| EM | 009203649-0001 | S | 10/2022 |
| EM | 015012735-0001 | S | 2/2023 |
| EP | 2613563 | B1 | 6/2016 |
| EP | 2999240 | B1 | 12/2018 |
| EP | 3138299 | B1 | 10/2019 |
| EP | 3411861 | B1 | 4/2020 |
| EP | 3669695 | A2 | 6/2020 |
| EP | 3491627 | B1 | 11/2020 |
| EP | 3383060 | B1 | 12/2020 |
| EP | 3834184 | A1 | 6/2021 |
| EP | 4027655 | A1 | 7/2022 |
| EP | 4029009 | A1 | 7/2022 |
| EP | 4033778 | A1 | 7/2022 |
| GB | 9002055954-0003 | S | 6/2012 |
| GB | 8086503000-1000 | S | 5/2015 |
| GB | 9003119940-0002 | S | 5/2016 |
| GB | 2577569 | B | 6/2022 |
| JP | WO 2021/131705 | * | 7/2021 |
| KR | 20090096006 | A | 9/2009 |
| KR | 20210067066 | A | 6/2021 |
| WO | 2009060420 | A1 | 5/2009 |
| WO | 2021131705 | A1 | 7/2021 |

OTHER PUBLICATIONS

Thorne, Scott; Design U.S. Appl. No. 29/912,445 entitled "Resonator Device", filed Sep. 19, 2023; United States Patent and Trademark Office; Alexandria, Virginia.

Thorne, Scott; Design U.S. Appl. No. 29/912,972 entitled "Camera With Integrated Resonator", filed Sep. 26, 2023; United States Patent and Trademark Office; Alexandria, Virginia.

Gahimer, Curtis; Related U.S. Continuation In-Part U.S. Appl. No. 18/474,539 entitled "Speaker Device", filed Sep. 26, 2023; United States Patent and Trademark Office; Alexandria, Virginia.

Philips Hue Secure Wired Camera; https://www.philips-hue.com/en-us/products/all-products/product-page/secure-cameras#overview; 2023.

Gahimer, Curtis; PCT Application No. PCT/US2023/028445 for Speaker Device; filed Jul. 24, 2023; United States Patent and Trademark Office; Alexandria, Virginia.

Thayer, Jordan; PCT Application No. PCT/US2023/033201 for Resonator Devices and Assemblies Thereof; filed Sep. 20, 2023; United States Patent and Trademark Office; Alexandria, Virgina.

Gahimer, Curtis; PCT Application No. PCT/US2023/033697 for Speaker Device; filed Sep. 26, 2023; United States Patent and Trademark Office; Alexandria, Virginia.

Kuhnen, Leila; Invitation To Pay Additional Fees, and Where Appliclcable, Protest Fees dated Jan. 19, 2024; International Application No. PCT/US2023/033201; European Patent Office; Rijswijk, Netherlands.

John C. Baumhauer Ph.D .; "1-Day MWM Acoustical Design Course"; MWM Acoustics; Feb. 10, 2006; pp. 61-62.

Leo L. Beranek and Tim J. Mellow; "Acoustics: Sound Fields and Transducers"; 2012; pp. 130, 135,392-395; Elsevier, Inc.; Waltham, Massachusetts, USA.

(56) References Cited

OTHER PUBLICATIONS

"Figure 14"; Bell Telephone Laboratories, Inc.; likely 1975.
"Figure 15"; Bell Telephone Laboratories, Inc.; 1975.
"Figure 16"; Bell Telephone Laboratories, Inc.; likely 1975.
"Figure 17"; Bell Telephone Laboratories, Inc.; likely 1975.
"Governing Equations of Wholly Acoustic System"; JCB; Bell Telephone Laboratories, Inc.; likely 1975.
F.F. Romanow; "Preface to Issue 1"; Bell Telephone Laboratories, Inc.; Aug. 1949.
F.F. Romanow; "Preface to the Second Edition"; Bell Telephone Laboratories, Inc.; Dec. 1962.
Indy Acoustic Research; "Frequency Response Comparison Graph"; 2019.
Scott Thorne; "Resonator Device"; U.S. Appl. No. 29/868,042, filed Nov. 17, 2022.
Jordan Thayer and Rodrigo Alexei Vasquez; "Resonator Devices and Assemblies Thereof"; U.S. Appl. No. 18/056,390, filed Nov. 17, 2022.
Exner, Karin; International Search Report and Written Opinion dated Nov. 10, 2023; International Application No. PCT/US2023/028445; European Patent Office; Rijswijk, Netherlands.
Exner, Karin; Invitation To Pay Additional Fees, and Where Applicable, Protest Fees dated Nov. 17, 2023; International Application No. PCT/US2023/033697; European Patent Office; Rijswijk, Netherlands.
Le, Huyen D.; Non-Final Rejection dated Feb. 27, 2024; Continuation U.S. Appl. No. 18/474,539; United States Patent and Trademark Office; Alexandria, Virginia.
Ipinazar, Paula; International Search Report and Written Opinion of the International Searching Authority dated Feb. 14, 2024; International Application No. PCT/US2023/033697; European Patent Office; Rijswijk, Netherlands.
Gahimer, Curtis; Related Continuation U.S. Appl. No. 18/782,355 entitled "Speaker Device", filed Jul. 24, 2024; United States Patent and Trademark Office; Alexandria, Virginia.
Le, Huyen D.; Notice of Allowance and Fees Due dated Jul. 24, 2024; U.S. Appl. No. 18/474,539; United States Patent and Trademark Office; Alexandria, Virginia.
Gahimer, Curtis; Related U.S. Divisional U.S. Appl. No. 18/755,878 entitled "Speaker Device", filed Jun. 27, 2024; United States Patent and Trademark Office; Alexandria, Virginia.
Le, Huyen D .; Notice of Allowance and Fees Due dated May 23, 2024; U.S. Appl. No. 18/474,539; United States Patent and Trademark Office; Alexandria, Virginia.
Curtis Gahimer et al.; U.S. Appl. No. 18/987,611 entitled "Speaker Device" Dec. 19, 2024; United States Patent and Trademark Office; Alexandria, Virginia.
Liebgott, Tyler Michael; Non-Final Office Action dated Dec. 27, 2024; U.S. Appl. No. 18/056,390; United States Patent and Trademark Office; Alexandria, Virginia.
Chatel, Cecile; International Preliminary Report on Patentability dated Apr. 10, 2025; International Application No. PCT/US2023/028445; The International Bureau of WIPO; Geneva, Switzerland.
Lee, Sun Hwa; International Preliminary Report on Patentability; dated Apr. 10, 2025; International Application No. PCT/US2023/033697; The International Bureau of WIPO; Geneva, Switzerland.
Liebgott, Tyler Michael; Notice of Final Rejection dated Apr. 16, 2025; U.S. Appl. No. 18/056.390; United States Patent and Trademark Office; Alexandria, Virginia.

* cited by examiner

SPEAKER DEVICE

FIELD

The present disclosure is directed to speaker devices for increasing an output of the speaker device at a particular frequency or frequency range.

BACKGROUND

Devices with electrodynamic speakers often include an internal front chamber positioned in front of a speaker. Openings in housings of such devices allow acoustic waves to exit the housing.

SUMMARY OF THE DISCLOSURE

In one aspect of the present disclosure, a device is provided that includes a speaker and a housing. The speaker is configured to generate sound and includes a diaphragm. The housing encloses the speaker and includes a plurality of openings within one portion of the housing. The speaker is positioned within the housing to define a front chamber between the diaphragm and the one portion, and the plurality of openings are sized to collectively generate, with the front chamber, an increased output of the device within a frequency range of an output of the speaker corresponding to an alarm tone.

The front chamber and the plurality of openings may be configured to create a resonator having a resonance frequency within the frequency range of the alarm tone to selectively increase a sound pressure level of the output of the device corresponding to the alarm tone.

The speaker may be an electrodynamic speaker capable of generating an output within a frequency range of from 400 Hz to 4.0 kHz. The increased output of the device may include a peak output of the device within the frequency range of the output of the speaker corresponding to the alarm tone.

The one portion of the housing may be a first end of the housing, and the front chamber may include the plurality of openings within the one end of the housing but may otherwise be acoustically sealed.

The frequency range of the output of the speaker corresponding to the alarm tone may fall within a range from 2.0 kHz to 4.0 kHz. The speaker may be a security alarm speaker and the output of the speaker may further include speech. A sound pressure level of the output of the speaker may be increased by at least 6 dB.

In another aspect of the present disclosure, a method for assembling a device includes: providing a speaker and a housing, the speaker being configured to generate sound and including a diaphragm, and the housing including a plurality of openings within one portion; and assembling the housing and the speaker to form the device such that the housing encloses the speaker and the speaker is positioned within the housing to define a front chamber between the diaphragm and the one portion. The plurality of openings are sized to collectively generate, with the front chamber, an increased output of the device within a frequency range of an output of the speaker corresponding to an alarm tone.

The method may further include dimensioning the housing such that the front chamber and the plurality of openings create a resonator having a resonance frequency within the frequency range of the alarm tone to selectively increase a sound pressure level of the output of the device corresponding to the alarm tone.

The speaker may be an electrodynamic speaker capable of generating an output within a frequency range of from 400 Hz to 4.0 kHz. The increased output of the device may include a peak output of the device within the frequency range of the output of the speaker corresponding to the alarm tone.

The method may further include acoustically sealing the front chamber such that acoustic waves generated by the speaker are directed only through the plurality of openings.

The method may further include configuring the housing and the speaker such that a sound pressure level of the output of the speaker is increased by at least 6 dB.

In a further aspect of the present disclosure, a method includes providing a speaker including a diaphragm; providing a housing for enclosing the speaker and including a plurality of openings within one portion of the housing; positioning the speaker within the housing to define a sealed front chamber between the diaphragm and the one portion, in which the speaker and the housing define a device; and defining one or more parameters of the device to collectively create a resonator having a resonance frequency matching at least a portion of a frequency range of an output of the speaker corresponding to an alarm tone.

The speaker may be an electrodynamic speaker, the frequency range of the output of the speaker is from 400 Hz to 4.0 kHz, and the output of the speaker corresponding to the alarm tone may fall within a range from 2.0 kHz to 4.0 kHz.

The one or more parameters may include a volume of the front chamber, and the method may further include: increasing the volume of the front chamber when the resonance frequency is to be decreased; and decreasing the volume of the front chamber when the resonance frequency is to be increased.

The one or more parameters may include a cross-sectional area of each of the openings, and the method may further include: decreasing the cross-sectional area of the openings when the resonance frequency is to be decreased; and increasing the cross-sectional area of the openings when the resonance frequency is to be increased.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale. Aspects of the present disclosure are described with reference to the following drawings in which numerals reference like elements, and in which.

DETAILED DESCRIPTION

Figure 1:
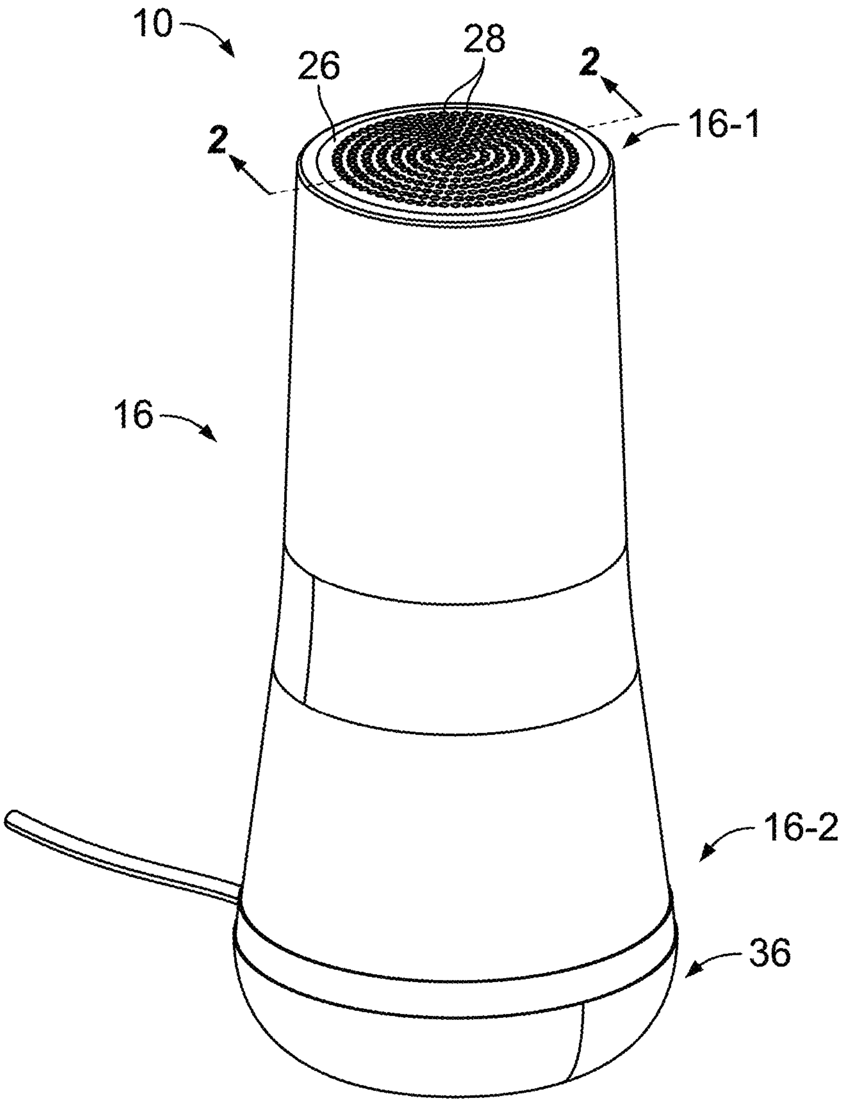
FIG. 1 is a perspective view of a device in accordance with the present disclosure.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Many conventional speaker devices that are used to generate an alarm, such as piezoelectric speakers, are unable to generate output of a sufficient sound pressure level across a broad frequency range of, for example, 400 Hz to 4.0 kHz. As a result, these speaker devices may generate an alarm tone with a high sound pressure level but often cannot generate speech because the bandwidth of piezoelectric speakers generally is not wide enough. In accordance with the present disclosure, the speaker device may include a Helmholtz resonator that is configured to increase the sound pressure level of a peak output of the device across a wide enough range to generate an alarm tone and speech that are audible to the average person and also intelligible in the case of speech, with the peak output of the device corresponding to the alarm tone.

The present disclosure provides a solution for improving an output of a speaker device comprising a housing and a speaker in a manner that minimizes substantial changes to the device, yet provides improved output. The improved output occurs at a desired frequency or frequency range, yet does not substantially reduce the output of the device at frequencies below the desired frequency or frequency range. In one example, the desired frequency or frequency range corresponds to an alarm tone, such that the output of the speaker device is increased at the desired frequency or frequency range corresponding to the alarm tone. This increase in output is achieved by modifying the device such that it defines a Helmholtz resonator having a resonance frequency at or near a frequency or frequency range of the alarm tone.

Figure 2:
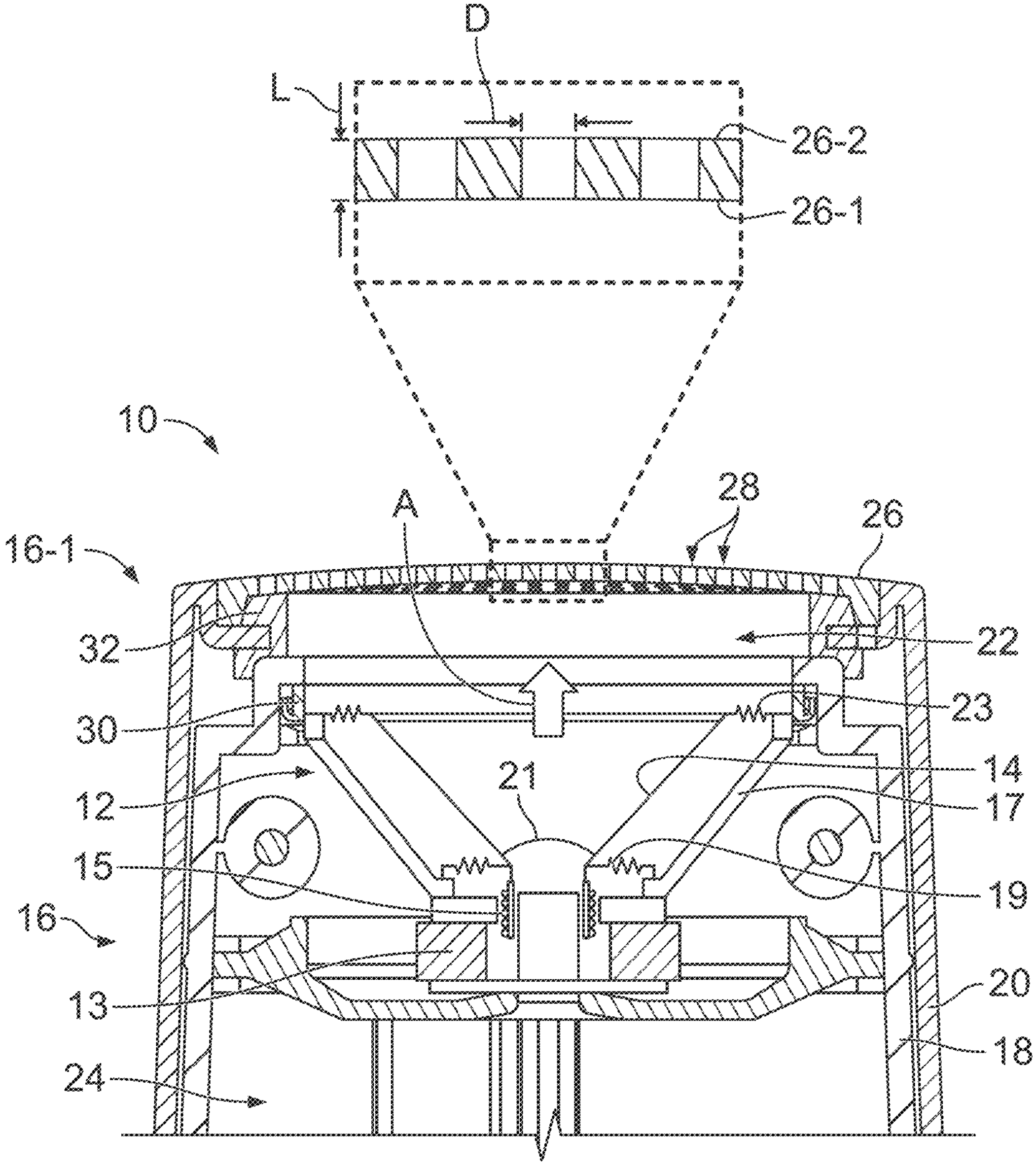
FIG. 2 is a cross-sectional view of the device of FIG. 1 taken along line 2-2.

FIGS. 1 and 2 show an exemplary device 10 in accordance with the present disclosure. The device 10 may comprise a speaker 12 (e.g., a loudspeaker) and may be configured to generate sound. The speaker 12, which is shown schematically in FIG. 2, may be an electrodynamic speaker and may include a cone or diaphragm 14 and other known components, such as a magnet 13, a voice coil 15, a chassis 17, a spider 19, a dust cap 21, and a surround 23, all of which may be collectively referred to as a driver. Furthermore, the device 10 may include additional electronic components such as, for example, a wireless antenna, microcontroller, audio amplifier, power circuit, batteries, LED lights (also not shown). A housing 16 receives and encloses the speaker 12. In the example shown in FIG. 2, the housing 16 comprises an assembly including a speaker enclosure 18, a cover 20, and a grill 26. The speaker enclosure 18 receives the speaker 12, and the cover 20 receives and at least partially surrounds the speaker enclosure 18. In other examples (not shown), the housing 16 may comprise either the speaker enclosure 18 or the cover 20, along with the grill 26. In further examples, as described below, the grill 26 may be integral, such that the housing 16 comprises a single component. The device 10 may comprise a base station, as described with respect to FIGS. 13 and 14.

With continued reference to FIGS. 1 and 2, the housing 16 may comprise any shape, and the speaker 12 may be positioned within the housing 16 to define a front chamber 22 between the diaphragm 14 and one portion of the housing 16. A rear chamber 24 may be defined between the speaker 12 and another portion of the housing 16. In the example shown in FIGS. 1 and 2, the housing 16 comprises a first end 16-1 and a second end 16-2, with the front chamber 22 being defined between the diaphragm 14 and the first end 16-1 of the housing 16 and the rear chamber 24 being defined between the speaker 12 and the second end 16-2 of the housing 16. Hence, in the example shown in FIGS. 1 and 2, the one portion of the housing 16 is defined by the first end 16-1 of the housing 16 and the other portion of the housing is defined by the second end 16-2 of the housing 16.

The housing 16 may comprise a plurality of openings 28 formed within a portion thereof, specifically the first end 16-1 of the housing 16 in the embodiment of FIGS. 1 and 2. In the example shown in FIGS. 1 and 2, the grill 26 includes the plurality of openings 28 such that the grill 26 defines the portion or first end 16-1 of the housing 16. In the example illustrated in FIGS. 1 and 2, the grill 26 is a separate component coupled to the cover 20. In other examples (not shown), the grill 26 may be integral with the cover 20, e.g., the plurality of openings 28 may be formed directly in the cover 20.

The openings 28 may comprise a generally circular shape, as shown in FIGS. 1 and 2, or may define other shapes (not shown) such as elongated slots, a hexagonal or honeycomb shape, etc. In the examples shown, the openings 28 are arranged in a series of concentric circles. In other examples (not shown), the openings may be arranged in a grid comprising one or more rows. A spacing between the openings 28 within a concentric circle or within a row and/or between the concentric circles or between the rows may be substantially uniform. With reference to the detailed view in the inset of FIG. 2, the grill 26 may comprise an inner surface 26-1 and an outer surface 26-2, and the openings 28 may extend between the inner and outer surfaces 26-1, 26-2. The openings 28 comprise a diameter D and a length L, in which the length L is defined by a distance between the inner and outer surfaces 26-1, 26-2 of the grill 26, i.e., by a thickness of the grill 26. The openings 28 also comprise a cross-sectional area, and for circular openings, the cross-sectional area is defined by a radius (not labeled) of the opening 28. In some examples, the cross-sectional area of each opening 28 may be uniform along an entirety of the length L, as shown in FIG. 2. In other examples, the cross-sectional area may vary along at least a portion of the length L of the opening 28.

Figure 3:
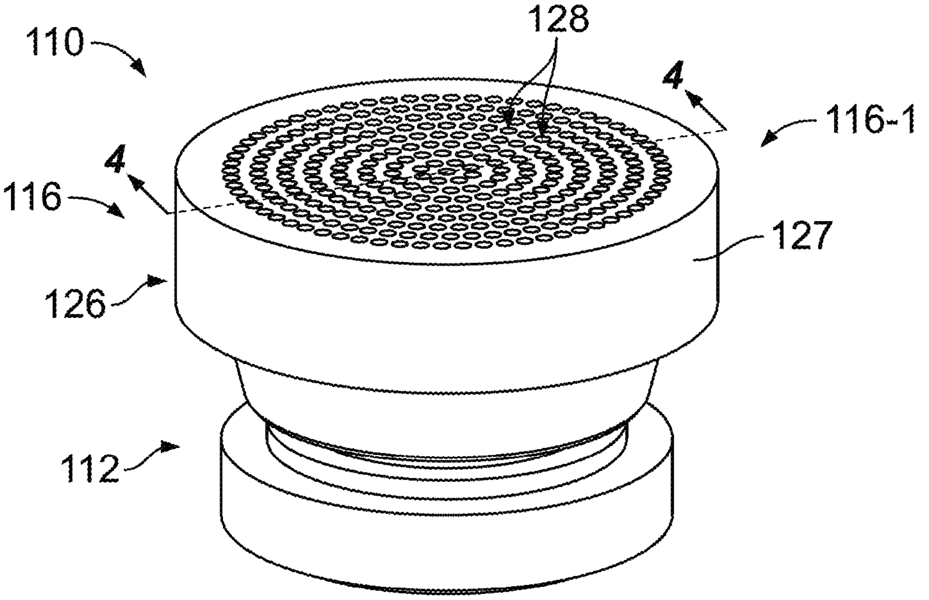
FIG. 3 is a perspective view of a portion of another device in accordance with the present disclosure.
Figure 4:
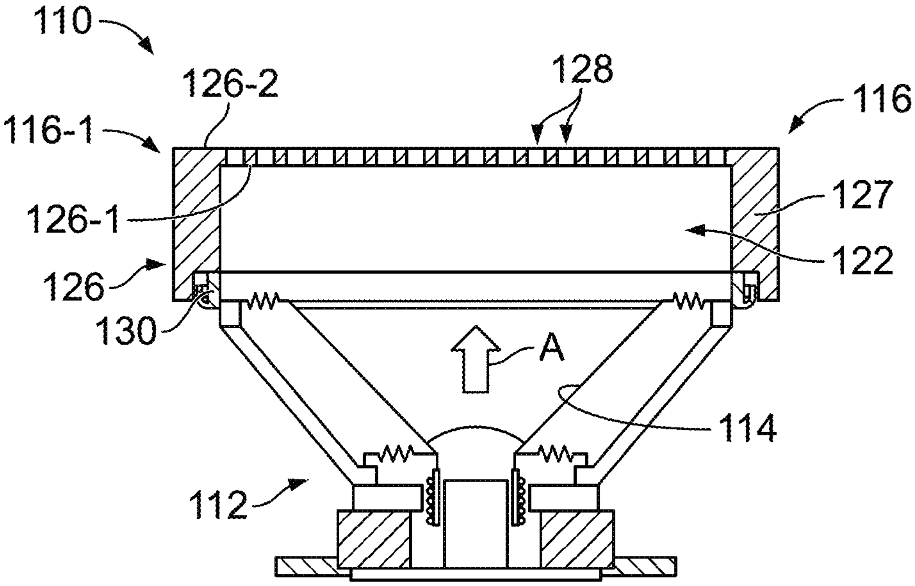
FIG. 4 is a cross-sectional view of the device of FIG. 3 taken along line 4-4.

FIGS. 3 and 4 depict another exemplary device 110, in which a speaker 112 and a portion of a housing 116 are shown. The speaker 112 may be substantially similar to the speaker 12 shown in FIG. 2 and may comprise a diaphragm 114 (the additional components of the speaker 112 are not labeled in FIG. 4). Instead of a separate grill, a first end 116-1 of the housing 116 may comprise a cap 126, which is an integral structure that comprises an inner surface 126-1, an outer surface 126-2, a plurality of openings 128 extending between the inner and outer surfaces 126-1, 126-2, and a sidewall 127 extending outward from the inner surface 126-1. The openings 128 may be substantially similarly to the openings 28 shown in FIGS. 1 and 2 and may comprise a diameter and a length (not labeled), in which the length of individual openings 128 is defined by a distance between the inner and outer surfaces 126-1, 126-2 of the cap 126. The openings 128 may also comprise a cross-sectional area. A front chamber 122 is defined between the speaker 112 and the first end 116-1 of the housing 116. The housing 116 may further comprise a cover and/or speaker enclosure (not shown; may be similar to the cover 20 and/or speaker enclosure 18 shown in FIG. 2) that receives and encloses the speaker 112. In the example shown, the cap 126 may be a separate component that is received in or otherwise coupled to the cover and/or speaker enclosure. In other examples, the cap 126 may be part of the cover and/or speaker enclosure. A rear chamber (not shown; see FIG. 2) may be formed between the speaker 112 and a second end (not shown; see FIG. 1) of the housing 116.

In the devices 10, 110 shown in FIGS. 1-4, the front chamber 22, 122 may be in fluid communication with an outside environment via the plurality of openings 28, 128. An electronic audio signal, which could be a wireless audio signal, may be supplied to the device 10, specifically to the speaker 12, which converts the audio signal to sound in the form of acoustic waves. The electronic audio signal passes through the coil 15 causing an electro-magnetic field to be produced, which interacts with a field produced by the magnet 13, causing the coil 15 and the diaphragm 14, which is attached to the coil 15, to move together. Movement of the diaphragm 14 causes a disturbance in the air surrounding it and thus produces acoustic waves. The acoustic waves generated by the speaker 12, 112 generally travel in a direction indicated by arrow A in FIGS. 2 and 4 toward the first end 16-1, 116-1 of the housing 16, 116 and exit the housing 16, 116 through the openings 28, 128. Besides the openings 28, 128, the front chamber 22, 122 is otherwise acoustically sealed. Sealing of the front chamber 22, 122 ensures that the acoustic waves generated by the speaker 12, 112 exit only through the openings 28, 128 and prevents leakage of acoustic waves between the speaker 12, 112 and the housing 16, 116. The speaker 12, 112 may comprise a sealing element 30, 130 such as a gasket that provides a seal between the speaker 12, 112 and the housing 16, 116. As shown in FIG. 2, the device 10 may include a second sealing element 32 such as a gasket positioned between the grill 26 and the speaker enclosure 18 and/or cover 20 to prevent acoustic leaks between the grill 26, the speaker enclosure 18, and/or cover 20. The device 110 shown in FIG. 3 may eliminate the need for a second sealing element, as the sidewalls 127 of the cap 126 serve to acoustically seal the front chamber 122.

The speaker 12, 112 may be a security alarm speaker. Such a security alarm speaker 12, 112 may comprise a stand-alone speaker used in a security system for generating an alarm tone and, preferably, audible speech. One example of a security alarm speaker 12, 112 is an electrodynamic speaker. It is also contemplated that a security alarm speaker constructed in accordance with the present disclosure may be incorporated within any other security system device, such as smoke alarms, medical devices with alarms, cameras with alarms, and the like.

The electronic audio signal may comprise an alarm signal when it has a value or magnitude causing the speaker 12, 112 to generate an output comprising an alarm tone. In other examples, alternatively or in addition, the audio signal may comprise a speech signal when it has a value or magnitude causing the speaker 12, 112 to generate an output comprising, or otherwise in the form of, audible speech. The speech signal may correspond to human speech (live or recorded) or speech synthesized by a computer system. In one particular example, the audio signal may comprise an alarm signal and/or a speech signal such that the output generated by the speaker 12, 112 comprises an alarm tone and/or speech. Human speech typically has a frequency that falls within a range from 400 Hz to 4.0 kHz. Alarm tones typically have a frequency that fall within a range from 2.0 kHz to 4.0 kHz.

When the diaphragm 14, 114 vibrates, acoustic waves are generated in the front chamber 22, 122 and vent or otherwise escape through the plurality of openings 28, 128. An air volume in the front chamber 22, 122 acts as an acoustic spring, and air within the plurality of openings 28, 128 acts as an acoustic mass, which collectively create a resonator, specifically a Helmholtz resonator, as part of the device 10, 110.

Conventional devices often seek to avoid the effects produced by a Helmholtz resonator, which generally causes one or more peaks in the output, i.e., sound pressure output, of the device at certain frequencies and a reduction in output at frequencies higher than the Helmholtz resonance frequency. These peaks are typically undesirable, and conventional speaker devices are typically designed to have a resonance frequency of the resonator as high as possible so that the resonance frequency of the device is outside of the frequency bandwidth of the speaker output.

In accordance with the present disclosure, the device 10, 110 is designed to comprise a Helmholtz resonator. The resonance frequency or frequency range of the Helmholtz resonator of the device 10, 110 is tuned to match the frequency or frequency range of the output of the speaker 12, 112 when the speaker 12, 112 is generating the alarm tone, thereby increasing a sound pressure level of the output of the device 10, 110 when the speaker 12, 112 is generating the alarm tone. By doing so, the sound pressure level of the output of the device 10, 110 when generating an alarm tone can be increased without further costs that derive from changing components of the device 10, 110, as discussed further below.

Designing the resonance frequency or frequency range of the Helmholtz resonator to match that of the alarm tone may be achieved by designing/configuring/adjusting one or more parameters of the device 10, 110. In some examples, these parameters may include the volume of the front chamber 22, 122 and one or more dimension(s) of the openings 28, 128, specifically the diameter D of the openings 28, 128. Additional parameters may include, but are not limited to, other dimensions of the openings 28, 128, such as the length L; a total number of the openings 28, 128; and a percent open area (calculated by multiplying the number of openings 28, 128 by the cross-sectional area of the openings 28, 128 and dividing by a cross-sectional area of the diaphragm 14, 114). Hence, the openings 28, 128 may be sized to generate, with the front chamber 22, 122, the peak output of the device 10, 110 when the speaker 12, 112 is generating the alarm tone. In particular, the housing 16, 116 (i.e., the front chamber 22, 122 and the openings 28, 128) may be dimensioned to create a Helmholtz resonator having a resonance frequency or a narrow resonance frequency range that falls within or matches at least a portion of the frequency range of the output of the speaker when generating an alarm tone, such that the resonator is able to selectively increase a sound pressure level of the acoustic waves output by the device 10, 110 within this portion of the frequency range of the output of the speaker 12, 112 corresponding to the alarm tone. This increase in sound level may be achieved without further costs or alteration of the design or capabilities of the device 10, 110, such as speaker size, battery life, etc.

A guide to provide a rough estimate of the resonance frequency of a Helmholtz resonator may be calculated using the following basic equation:

$$f_{Helm} = \frac{1}{2\pi}\sqrt{\frac{K_{Front}}{M_{Openings}}} \tag{1}$$

$K_{Front}$ is a front chamber spring stiffness and may be calculated using the following equation:

$$K_{Front} = \frac{\rho_0 c_0^2}{V} \tag{2}$$

$M_{Openings}$ is an acoustic mass of the plurality of openings 28 and may be calculated using the following equation:

$$M_{Openings} = \frac{\rho_0}{nS}L \tag{3}$$

in which:

- $\rho_0$ is a density of a fluid medium, e.g., about 1.2 kg/$m^3$ for air;
- $c_0$ is a speed of sound in the fluid medium, e.g., about 345 m/s for air;
- V is a volume of air in the front chamber [$m^3$];
- S is a cross-sectional area of a single opening [$m^2$];
- n is a number of openings; and
- L is a length of each opening [m].

The formula for $M_{Openings}$ may be adapted to more accurately account for end effects and spacing of the openings as follows:

$$M_{Openings} = \frac{\rho_0}{\pi a^2}\left\{L + 1.7a\left(1 - \frac{a}{b}\right)\right\}\mathrm{kg/m^4} \tag{4}$$

in which:

- L is a length of each opening [m]
- a is a radius of the opening [m]; and
- b is a center-to-center distance between adjacent openings [m].

Equation (4) is described in Beranek, Leo L. Beranek, and Tim J. Mellow. *Acoustics: Sound Fields and Transducers*, Academic Press, 2012, Page 130. When designing a Helmholtz resonator with a desired resonance frequency, equations (1)-(4) may be used to determine a rough estimate for one or more parameter values for the Helmholtz resonator. As discussed further below, from this starting point, one or more of the parameters from equations (1)-(4) may be adjusted/varied until final values of the one or more parameters result in a Helmholtz resonator that generates a peak output of the device 10, 110 equal to the frequency or within the frequency range of the output of the speaker 12, 112, particularly when the speaker 12, 112 generates an alarm tone. Parameters used in equations (1)-(4) are discussed below with regard to FIGS. 5-8, which simulate the effect of various parameters on a peak output sound pressure level of a device and a frequency at which the peak output sound pressure level is observed.

In some examples, the speaker 12, 112 may be an electrodynamic speaker that is capable of generating an output within a frequency range of 400 Hz to 4.0 kHz. The frequency range of the alarm tone may fall within a range from 2.0 kHz and 4.0 kHz, and in one particular example, the frequency range of the alarm tone may be from 2.5 kHz to 2.7 kHz. The Helmholtz resonator may be configured to increase the sound pressure level of the peak output of the device 10, 110 when generating an alarm tone by at least 6 decibels (dB), and preferably by 10 dB or more. Sound pressure output is typically measured in units of dBSPL (decibels relative to 20 μPa).

Figure 5:
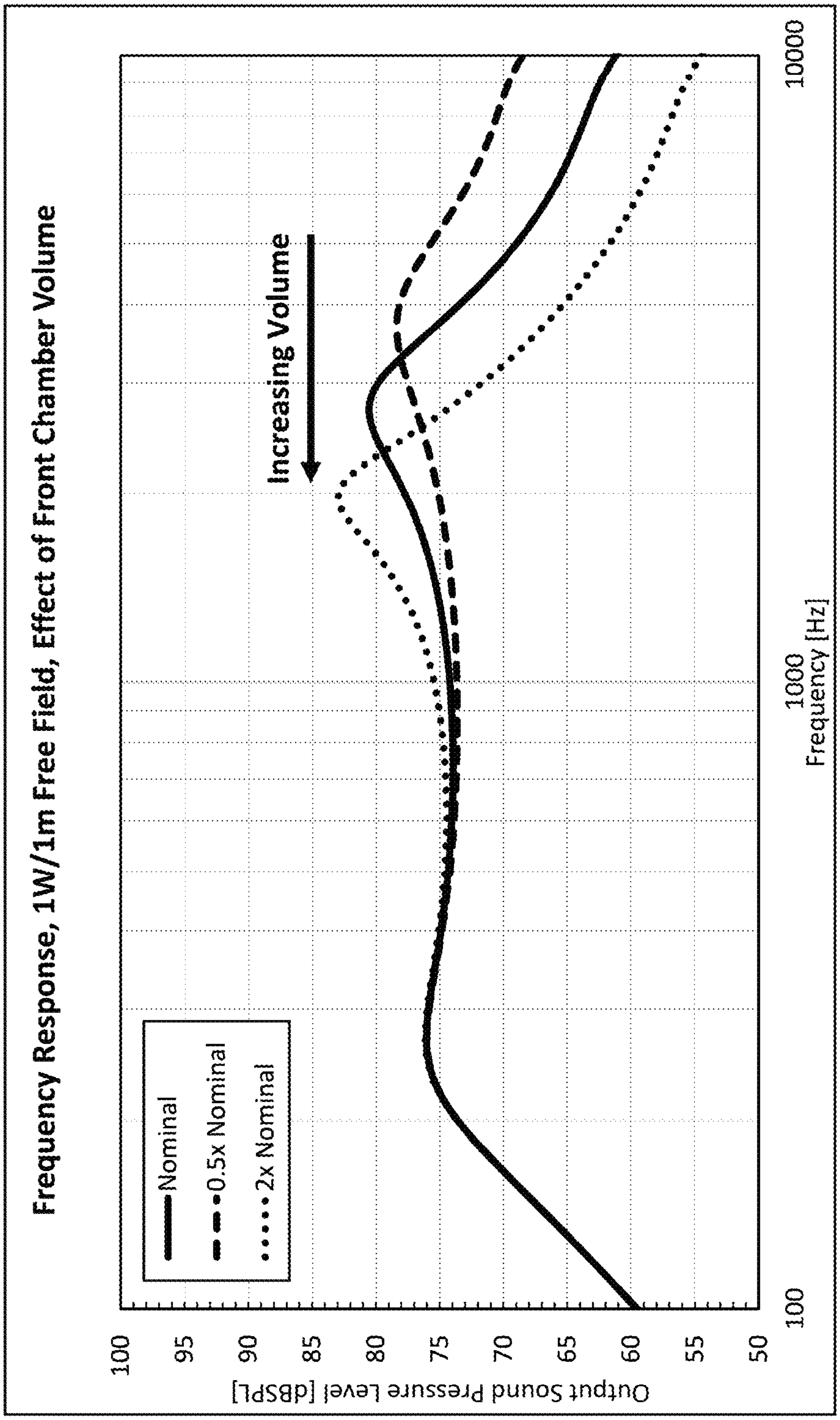
FIGS. 5-8 are graphs illustrating the effect of various parameters on output sound pressure level of a device in accordance with the present disclosure.

FIGS. 5-8 provide graphs simulating the effect of various parameters on a peak output sound pressure level of a device and a frequency at which the peak output sound pressure level is observed. FIG. 5 illustrates the effects of changing the front chamber volume while holding all other device parameters constant. As compared to a nominal or baseline level, increasing the front chamber volume (2×) decreases the frequency at which the peak output sound pressure level is observed, and decreasing the front chamber volume (0.5×) increases the frequency at which the peak output sound pressure level is observed. Increasing the front chamber volume also slightly increases the peak output sound pressure level, while decreasing the front chamber volume slightly decreases the peak output sound pressure level.

Figure 6:
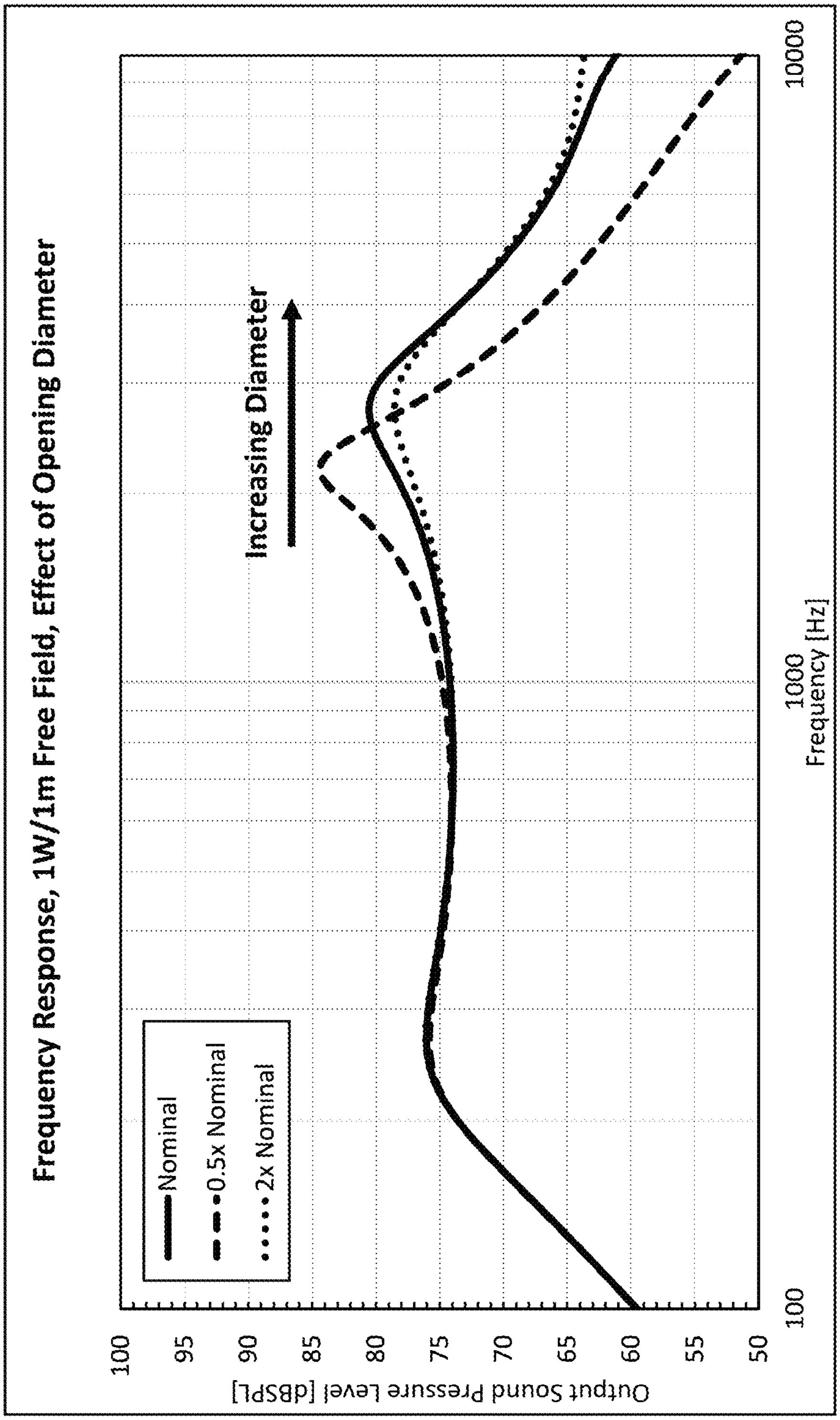

FIG. 6 illustrates the effects of changing the diameter or cross-sectional area of the openings while holding all other device parameters constant, including the number of openings provided. As compared to a nominal or baseline level, increasing the diameter of the openings slightly increases the frequency at which the peak output sound pressure level is observed, and decreasing the diameter decreases the frequency at which the peak output sound pressure level is observed. Increasing the diameter of openings also slightly decreases the peak output sound pressure level, while decreasing the diameter increases the peak output sound pressure level. It is also noted that increasing the total open area in the grill 26 or cap 126, wherein the total open area in the grill 26 or cap 126=(the total number of openings 28, 128 in the grill 26 or cap 126)×(the cross sectional area of each opening), while holding all other parameters constant, increases the frequency at which the peak output sound pressure level is observed, and decreasing the total open area in the grill 26 or cap 126 decreases the frequency at which the peak output sound pressure level is observed.

Figure 7:
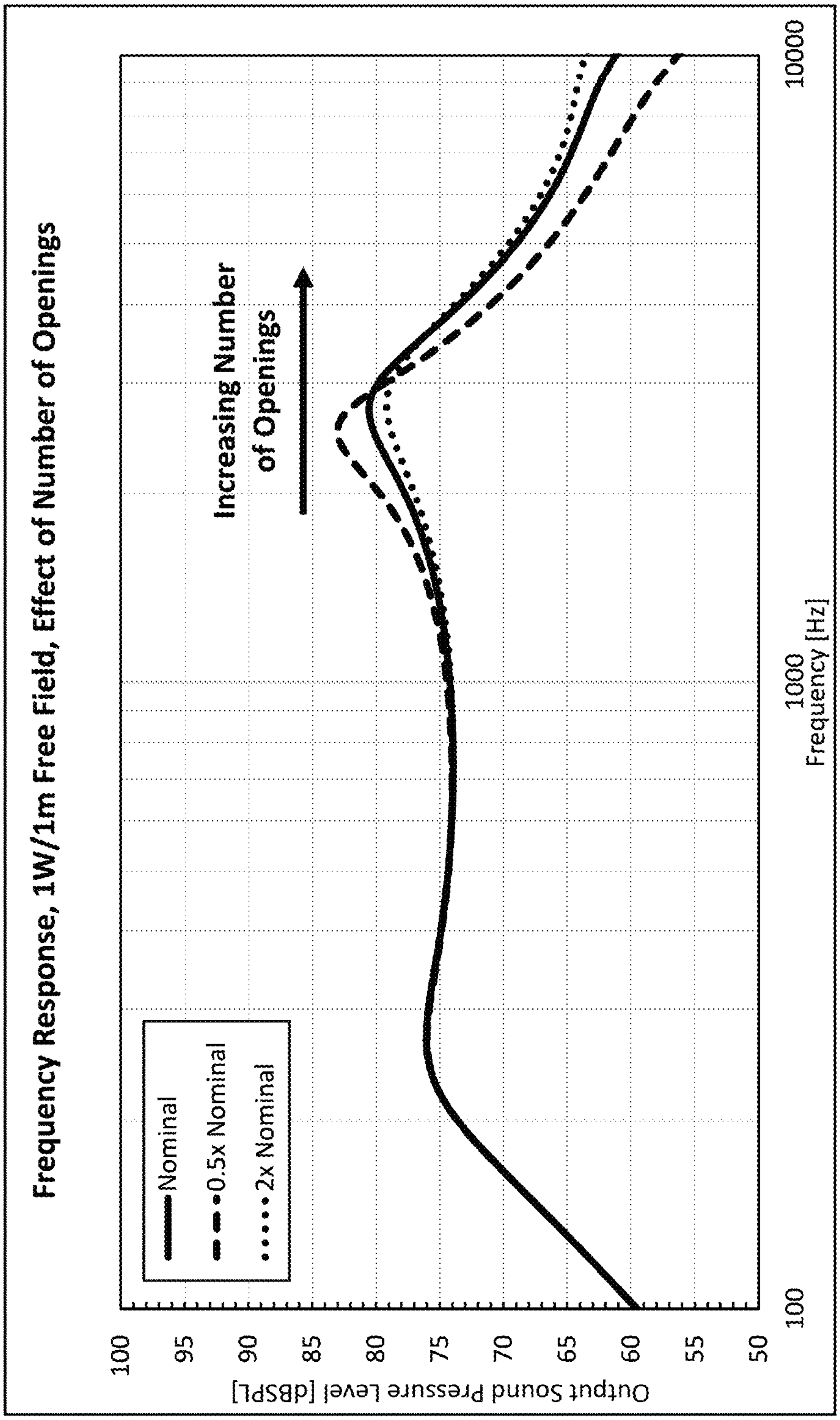

FIG. 7 illustrates the effects of changing the total number of openings while holding all other device parameters constant. As compared to a nominal or baseline level, increasing the total number of openings slightly increases the frequency at which the peak output sound pressure level is observed, and decreasing the total number of openings decreases the frequency at which the peak output sound pressure level is observed. Increasing the total number of openings also slightly decreases the peak output sound pressure level, while decreasing the total number of openings increases the peak output sound pressure level.

Figure 8:
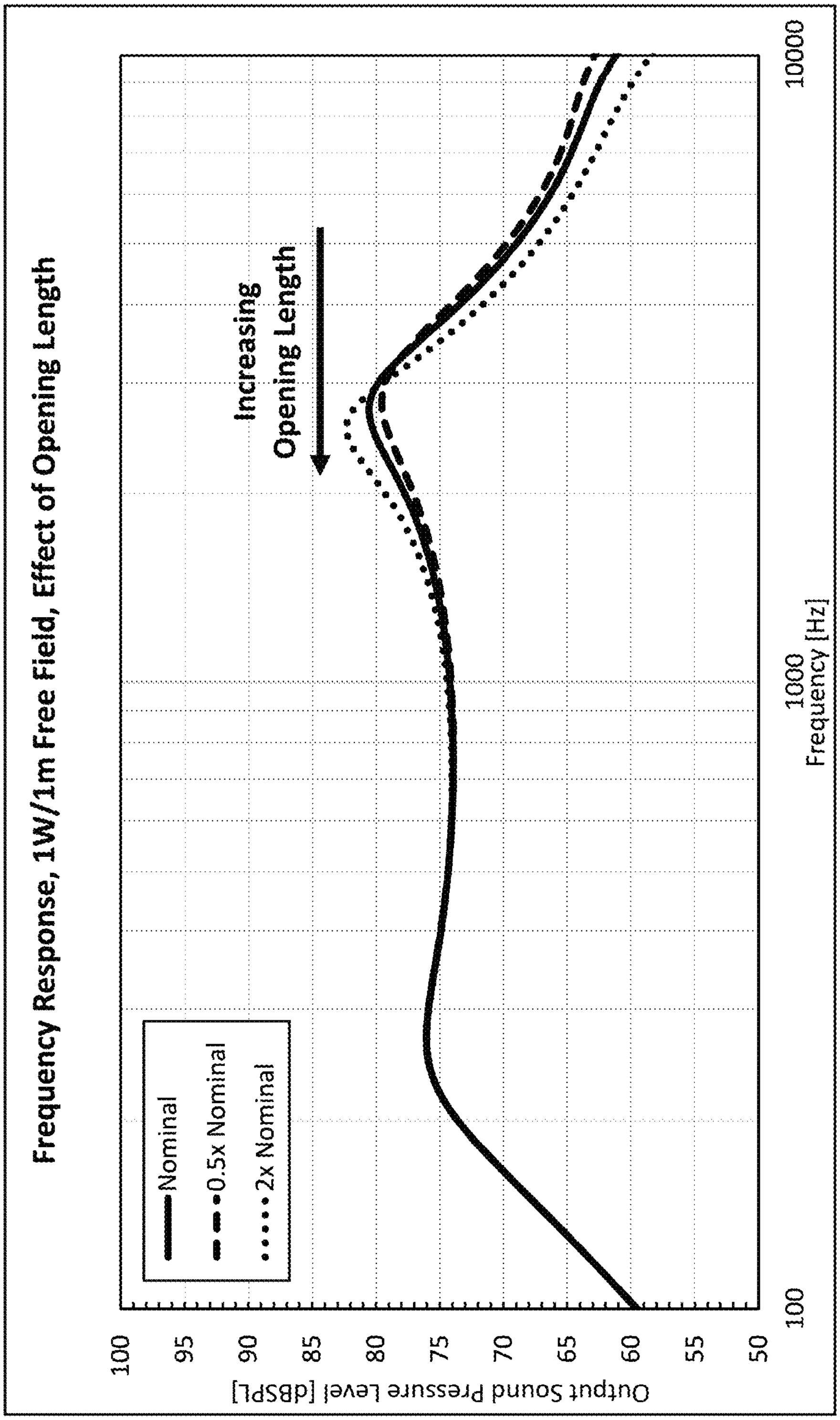

FIG. 8 illustrates the effects of the opening length while holding all other device parameters constant. As compared to a nominal or baseline level, increasing the opening length decreases the frequency at which the peak output sound pressure level is observed, and decreasing the opening length increases the frequency at which the peak output sound pressure level is observed. Increasing the opening length also increases the peak output sound pressure level, while decreasing the opening length decreases the peak output sound pressure level.

As noted above, a speaker device having a Helmholtz resonator with a desired resonance frequency may be designed using equations (1)-(4). Starting with a known, desired Helmholtz resonance frequency, such as one equal to the frequency of an alarm tone, initial values for one or more parameters of the speaker device may be determined using equations (1)-(4). Thereafter, a speaker device is built to determine if the output of the speaker device has a resonance frequency equal to or near the desired resonance frequency. If not, one or more of the parameters may be adjusted until those parameters result in a physical speaker device having the desired resonance frequency. FIGS. 5-8 provide guidance for adjusting one or more of the parameters set out in FIGS. (1)-(4). For example, as shown in FIGS. 5-8, when a resonance frequency of a speaker device is higher than the desired resonance frequency (i.e., the frequency at which the peak output sound pressure level is observed is higher than desired), the front chamber volume may be increased, the diameter and/or total number of the openings may be decreased, and/or the opening length may be increased. Also as shown in FIGS. 5-8, when the resonance frequency of the speaker device is lower than the desired resonance frequency (i.e., the frequency at which the peak output sound pressure level is observed is lower than desired), the front chamber volume may be decreased, the diameter and/or total number of the openings may be increased, and/or the opening length may be decreased. In this manner, the final values of the one or more parameters may be selected such that the Helmholtz resonator generates a peak output sound pressure level of the device that is equal to the desired frequency or within the desired frequency range, specifically a frequency or frequency range corresponding to an alarm tone.

Examples

Figure 9:
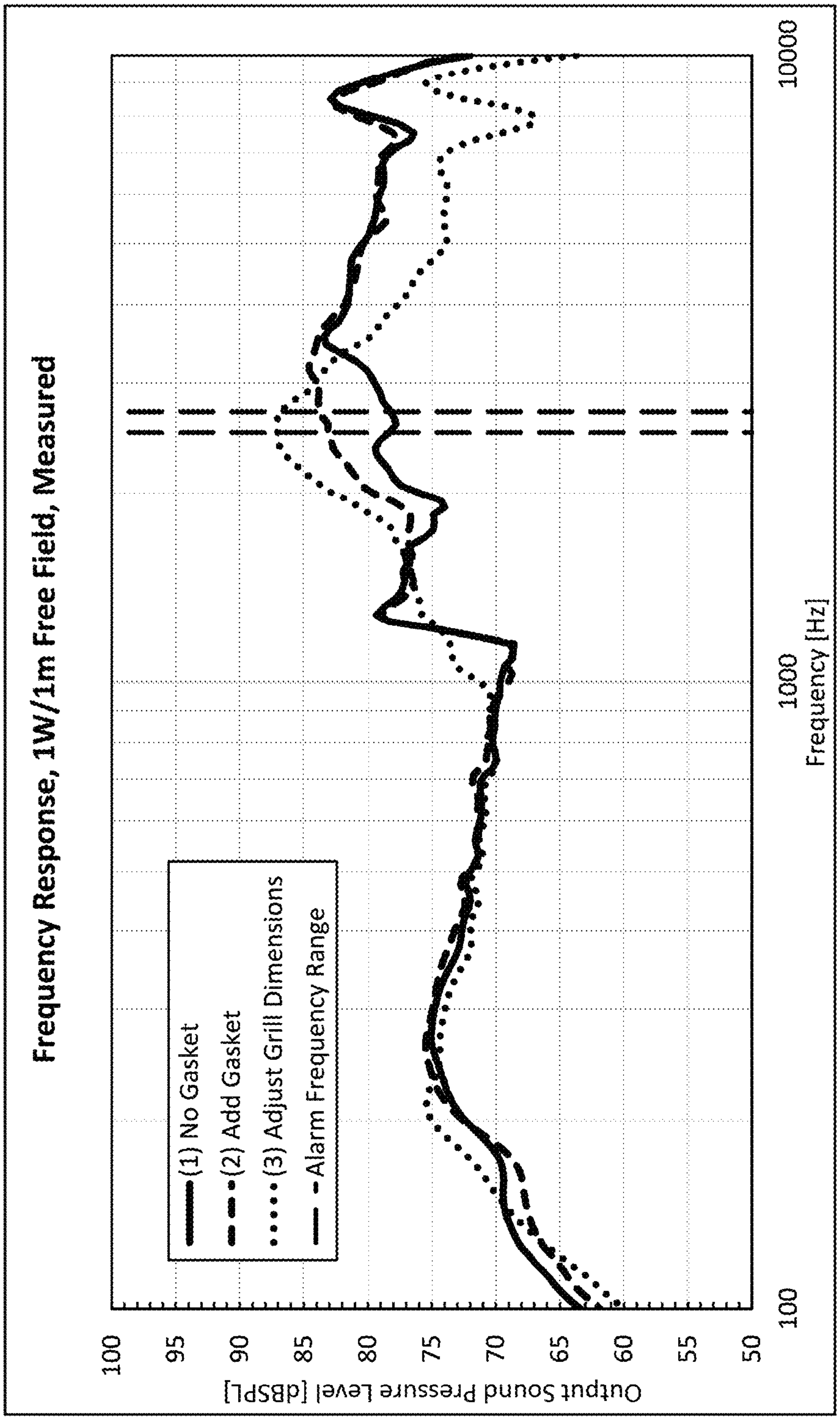
FIG. 9 is a graph illustrating an output sound pressure level of a device without a Helmholtz resonator and devices with Helmholtz resonators.

In the following example, three devices are constructed and tested, in which the parameters of each device are as follows:

Device (1) No Gasket
- Volume of front chamber=20 $cm^3$
- Number of circular openings=529
- Spacing between the concentric circles of openings=2.5 mm
- Spacing between openings within each concentric circle=2.0 mm
- Diameter of openings=1.0 mm
- Cross-sectional area of openings=0.75 $mm^2$
- Length of the openings=1.6 mm
- Helmholtz frequency=N/A (front chamber not sealed)
- 1 W/1 m Sound pressure output average within alarm range: 78.1 dBSPL Device (2) Add Gasket
- Volume of front chamber=20 $cm^3$
- Number of circular openings=529
- Spacing between the concentric circles of openings=2.5 mm
- Spacing between openings within each concentric circle=2.0 mm
- Diameter of openings=1.0 mm
- Cross-sectional area of openings=0.75 $mm^2$
- Length of the openings=1.6 mm
- Helmholtz frequency=3.15 kHz
- 1 W/1 m Sound pressure output average within alarm range: 83.4 dBSPL Device (3) Adjust Grill Dimensions
- Volume of front chamber=20 $cm^3$
- Number of circular openings=121
- Spacing between the concentric circles of openings=4.2 mm
- Spacing between openings within each concentric circle=3.1 mm
- Diameter of openings=1.8 mm
- Cross-sectional area of openings=2.54 $mm^2$
- Length of the openings=3 mm
- Helmholtz frequency=2.58 kHz
- 1 W/1 m Sound pressure output average within alarm range: 86.9 dBSPL FIG. 9 illustrates an output sound pressure level of Devices (1)-(3), which demonstrates the effects of acoustically sealing the front chamber and adjusting the number and dimensions of the openings on the sound pressure output level at a desired frequency or within a desired frequency range. The sound pressure output level is a sound pressure output average within the frequency range of an alarm when driven by a sine wave with 1 Watt RMS and measured at a distance of 1 meter from the device. The speaker used in Devices (1)-(3) is an electrodynamic speaker (Can Products Co., Ltd.; P/N: ED5040RR045WC-H27).

The solid line ("(1) No Gasket") in FIG. 9 corresponds to Device (1) above, which lacks a gasket between the speaker and the housing and does not create a Helmholtz resonator. The dashed line ("(2) Add Gasket") corresponds to Device (2) above, which is the same as Device (1) except that a gasket is added to seal the front chamber volume (see FIG. 2), such that a Helmholtz resonator is created with a resonance frequency of 3.15 kHz. The dotted line ("(3) Adjust Grill Dimensions") corresponds to Device (3) above, which is similar to Device (2) but with fewer openings. In addition, each opening in Device (3) has a greater diameter, cross-sectional area, and length, and a spacing between the concentric circles of openings and within the concentric circles is greater, as compared to the corresponding parameters of Device (2). It is believed that because the total open area in the grill of Device (3) was reduced as compared to Device (2), the resonance frequency was reduced. Device (3) includes a gasket and creates a Helmholtz resonator having a lower resonance frequency of 2.58 kHz. A desired frequency range of 2.5 kHz to 2.7 kHz, i.e., the frequency range of an alarm tone, is indicated with vertical dashed lines in FIG. 9.

It can be seen in FIG. 9 that Device (1) demonstrates the lowest average sound pressure output level (78.1 dBSPL) of the three devices within the desired frequency range of 2.5 kHz to 2.7 kHz. In addition, the average sound pressure output level of Device (1) within the range of 2.5 kHz to 2.7 kHz decreases slightly, as compared to adjacent frequencies, and the peak sound pressure output level of Device (1) occurs outside the desired frequency range. Adding the gasket in Device (2) to create a Helmholtz resonator results in an increase in the average sound pressure output level (83.4 dBSPL) within the desired frequency range of 2.5 kHz to 2.7 kHz, as compared to Device (1). However, the peak sound pressure output level of Device (2) still occurs outside the desired frequency range. Adding the gasket and adjusting the number and dimensions of the openings in Device (3) results in a further increase in the average sound pressure output level (86.9 dBSPL) within the desired frequency range of 2.5 kHz to 2.7 kHz, as compared to Device (2). It can also be seen that the peak sound pressure output level of Device (3) occurs within the desired frequency range.

Another device in accordance with the present disclosure is constructed and tested, in which the parameters of the device are as follows:

Device (4)

Volume of front chamber=20 $cm^3$

Number of circular openings=225

Spacing between the concentric circles of openings=3.3 mm

Spacing between openings within each concentric circle=2.6 mm

Diameter of openings=1.6 mm

Cross-sectional area of openings=2.0 $mm^2$

Length of the openings=1.6 mm

Helmholtz frequency=2.65 kHz

1 W/1 m Sound pressure output average within alarm range: 89.2 dBSPL

Figure 10:
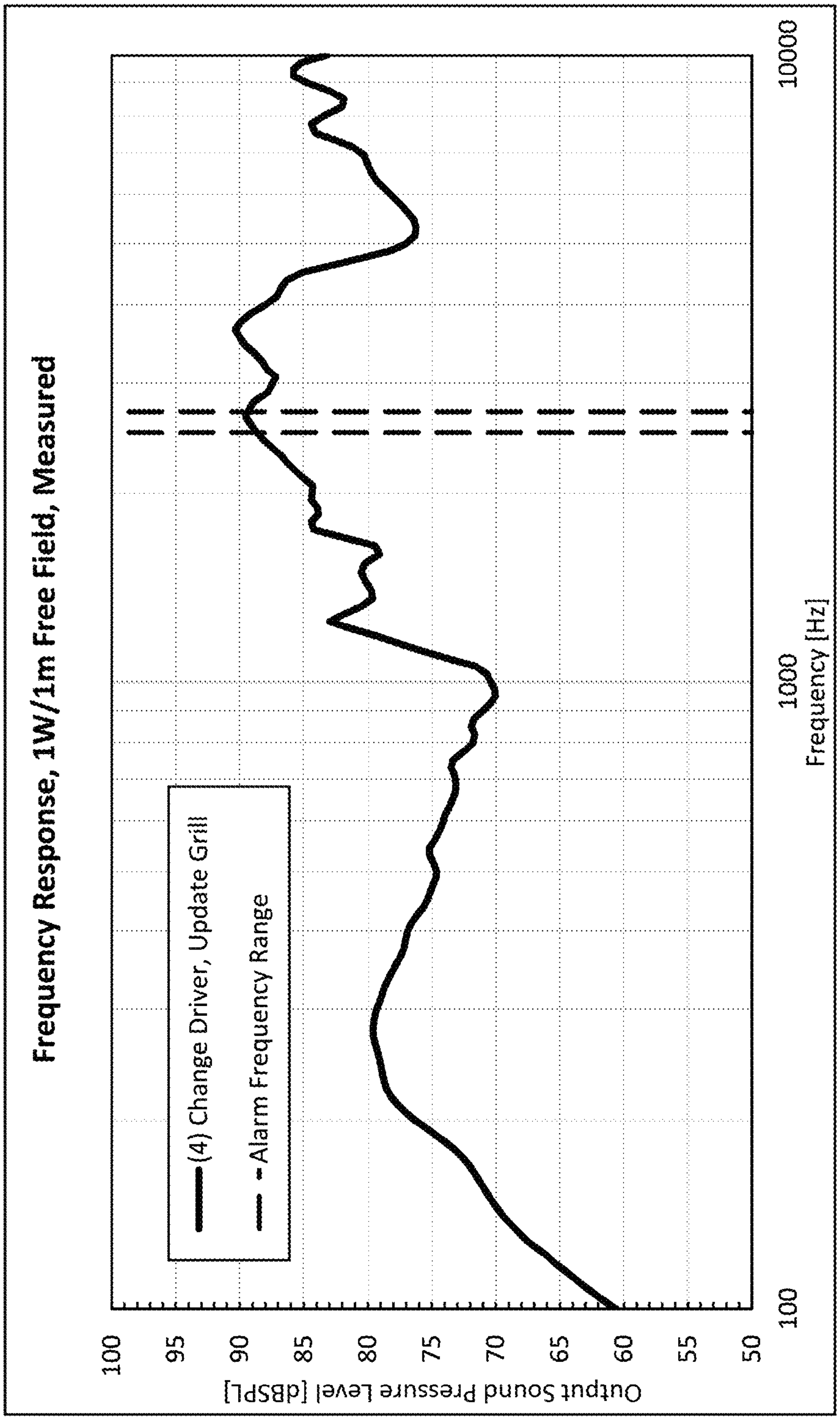
FIG. 10 is a graph illustrating performance of another device in accordance with the present disclosure.

Device (4) is similar to Device (3) and includes a gasket to acoustically seal the front chamber. The speaker used in Device (4) is an electrodynamic speaker (Ole Wolff; P/N: OWS-5026TA-4A). FIG. 10 illustrates an output sound pressure level of Device (4). A desired frequency range of 2.5 kHz to 2.7 kHz, i.e., the frequency range of an alarm tone, is indicated with vertical dashed lines in FIG. 10. It can be seen that the parameters of Device (4) result in an increase in the average sound pressure output level (89.2 dBSPL) within the desired frequency range of 2.5 kHz to 2.7 kHz, as compared to adjacent frequencies.

Figure 11:
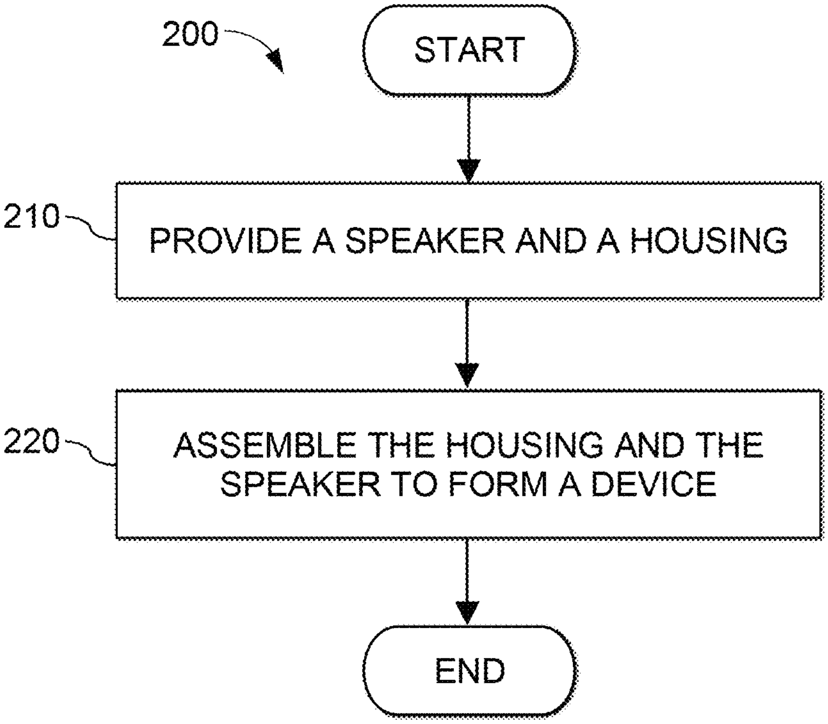
FIGS. 11 and 12 are flowcharts illustrating methods in accordance with the present disclosure.
Figure 12:
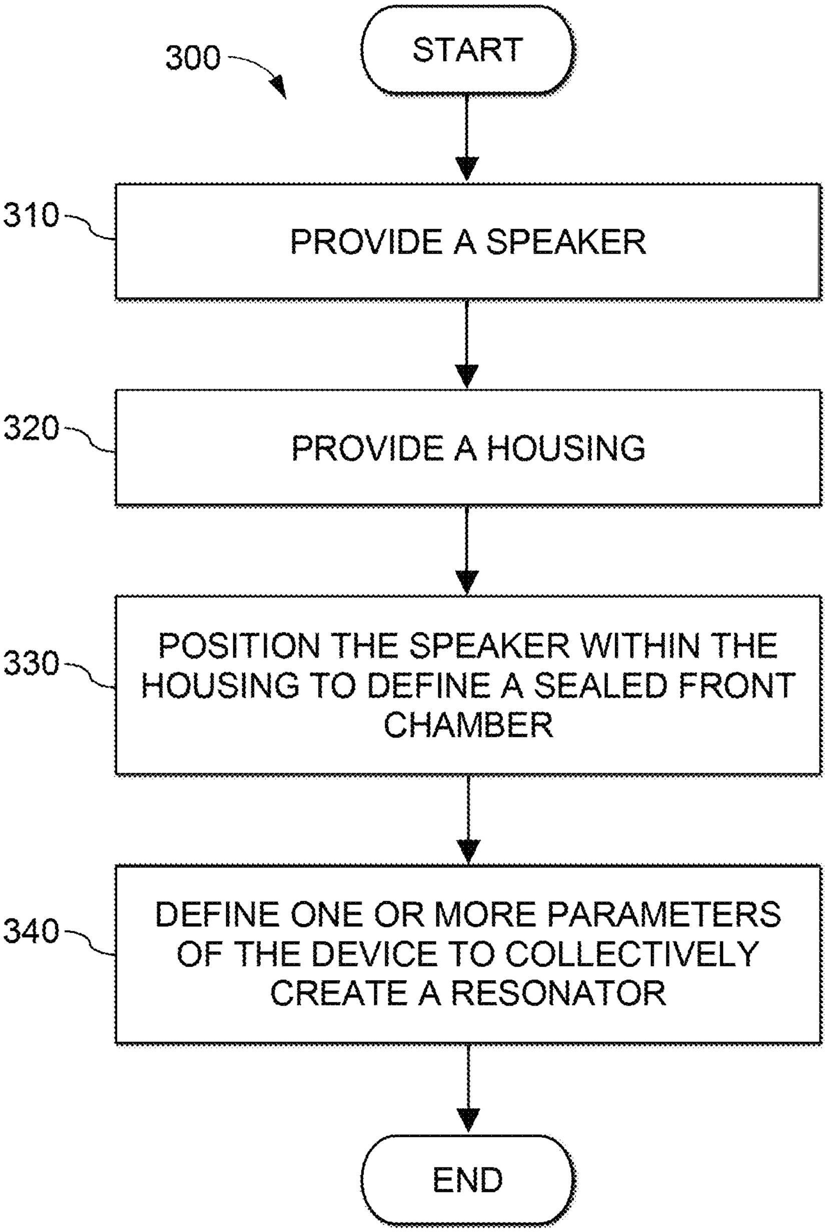

FIGS. 11 and 12 are flowcharts illustrating methods in accordance with the present disclosure. FIG. 11 illustrates a method 200 for assembling a device, the method 200 comprising providing a speaker and a housing at 210. The speaker may include a diaphragm and may be configured to generate sound. The housing may comprise a plurality of openings within one portion. At 220, the housing and the speaker are assembled to form the device such that the housing encloses the speaker and the speaker is positioned within the housing to define a front chamber between the diaphragm and the one portion. With reference to FIG. 1, in one example, the device 10 may be formed by disposing the speaker 12 in the housing 16, specifically the speaker enclosure 18, such that the housing 16 encloses the speaker 12; mounting the grill 26 to the cover 20; and placing the cover 20 and the grill 26 over the speaker enclosure 18. When the speaker is disposed in the housing 16, the speaker may be positioned relative to a portion, i.e., the first end 16-1, of the housing to define the front chamber 22. In the example shown, a base 36 receives the housing 16. As described herein, the plurality of openings may be sized to collectively generate, with the front chamber, an increased output of the device within a frequency range of an output of the speaker corresponding to an alarm tone. The method 200 may then conclude.

The method 200 may optionally further comprise dimensioning the housing such that the front chamber and the plurality of openings create a resonator having a resonance frequency within the frequency range of the alarm tone to selectively increase a sound pressure level of the output of the device corresponding to the alarm tone, as described herein with respect to, for example, FIGS. 5-8.

In some examples, the speaker may comprise an electrodynamic speaker capable of generating an output within a frequency range of from 400 Hz to 4.0 kHz. In other examples, the increased output of the device may comprise a peak output of the device within the frequency range of the output of the speaker corresponding to the alarm tone.

The method 200 may optionally further comprise acoustically sealing the front chamber as described herein such that acoustic waves generated by the speaker are directed only through the plurality of openings. In particular, configuring the housing may include adding a gasket to acoustically seal the front chamber.

The method 200 may optionally further comprise configuring the housing and the speaker such that a sound pressure level of the output of the speaker is increased by at least 6 dB, as described herein.

FIG. 12 illustrates a method 300 comprising providing a speaker at 310 and providing a housing at 320, in which the speaker includes a diaphragm and the housing is for enclosing the speaker and includes a plurality of openings within one portion of the housing. At 330, the speaker is positioned within the housing to define a sealed front chamber between the diaphragm and the one portion, as described herein, in which the speaker and the housing define a device. At 340, one or more parameters of the device are defined to collectively create a resonator having a resonance frequency matching at least a portion of a frequency range of an output of the speaker corresponding to an alarm tone, as described herein with respect to, for example, FIGS. 5-8. The method 300 may then conclude.

In some examples, the speaker may comprise an electrodynamic speaker, the frequency range of the output of the speaker may be from 400 Hz to 4.0 kHz, and the output of the speaker corresponding to the alarm tone may fall within a range from 2.0 kHz to 4.0 kHz.

The one or more parameters may comprise a volume of the front chamber, and the method 300 may optionally further comprise increasing the volume of the front chamber when the resonance frequency is to be decreased and decreasing the volume of the front chamber when the resonance frequency is to be increased, as described herein.

The one or more parameters may comprise a cross-sectional area of each of the openings, and the method 300 may optionally further comprise decreasing the cross-sectional area of the openings when the resonance frequency is to be decreased and increasing the cross-sectional area of the openings when the resonance frequency is to be increased, as described herein.

Figure 13:
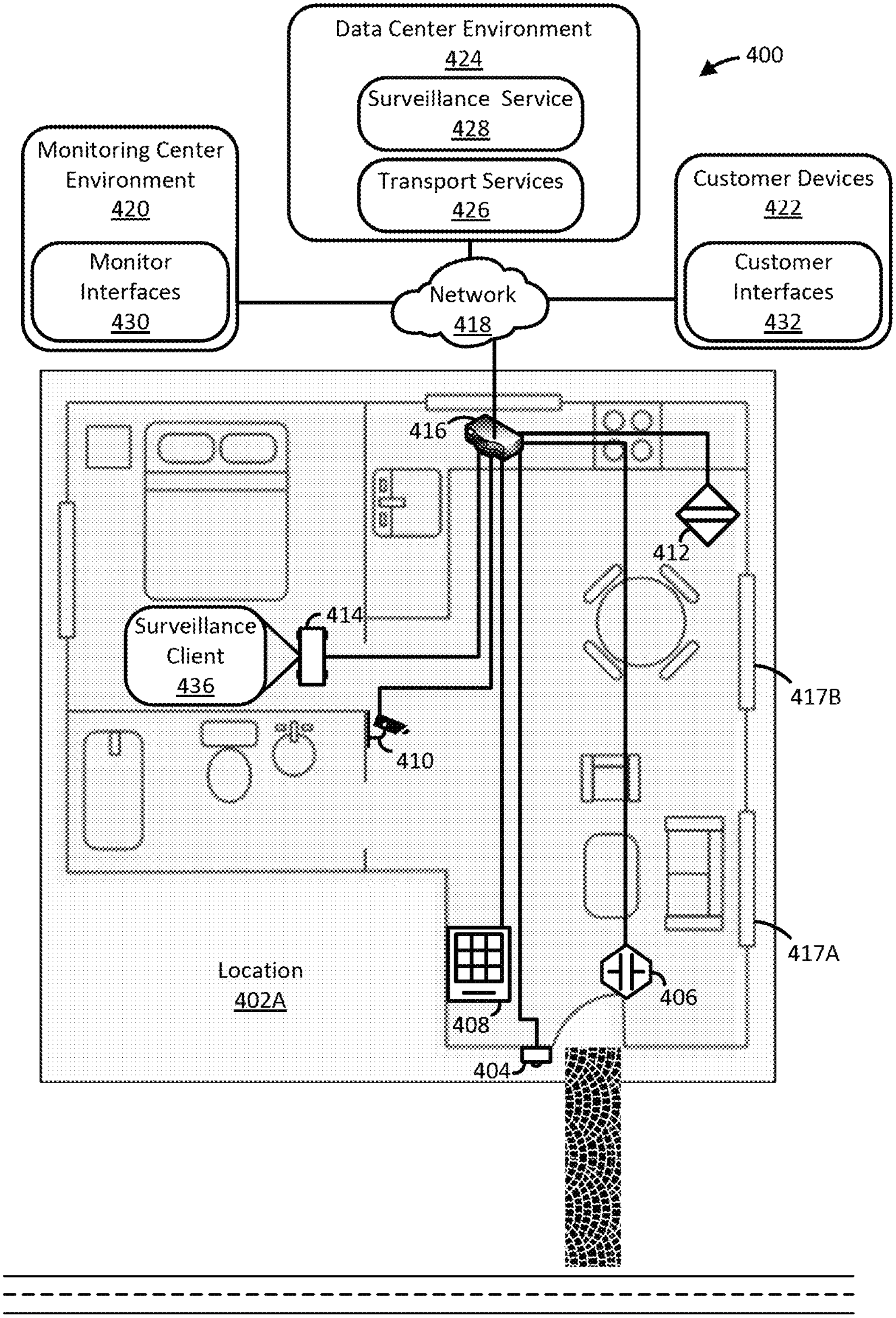
FIG. 13 is a schematic diagram of a security system, according to some examples described herein.

In some examples, a device in accordance with the present disclosure may be part of a security system. FIG. 13 is a schematic diagram of a security system 400 configured to establish and utilize zones in accordance with some examples. As shown in FIG. 13, the system 400 includes a monitored location 402A, a monitoring center environment 420, a data center environment 424, one or more customer devices 422, and a communication network 418. Each of the monitored location 402A, the monitoring center 420, the data center 424, the one or more customer devices 422, and the communication network 418 include one or more computing devices (e.g., as described below with reference to FIG. 17). The one or more customer devices 422 are configured to host one or more customer interface applications 432. The monitoring center environment 420 is configured to host one or more monitor interface applications 430. The data center environment 424 is configured to host a surveillance service 428 and one or more transport services 426. The location 402A includes image capture devices 404 and 410, a contact sensor assembly 406, a keypad 408, a motion sensor assembly 412, a base station 414, and a router 416. The base station 414 hosts a surveillance client 436.

In some examples, the router 416 is a wireless router that is configured to communicate with the devices disposed in the location 402A (e.g., devices 404, 406, 408, 410, 412, and 414) via communications that comport with a communications standard such as any of the various Institute of Electrical and Electronics Engineers (IEEE) 108.11 standards. As illustrated in FIG. 13, the router 416 is also configured to communicate with the network 418. It should be noted that the router 416 implements a local area network (LAN) within and proximate to the location 402A by way of example only. Other networking technology that involves other computing devices is suitable for use within the location 402A. For instance, in some examples, the base station 414 can receive and forward communication packets transmitted by the image capture device 410 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 13, the network 418 can include one or more public and/or private networks that support, for example, internet protocol (IP). The network 418 may include, for example, one or more LANs, one or more PANs, and/or one or more wide area networks (WANs). The LANs can include wired or wireless networks that support various LAN standards, such as a version of IEEE 108.11 and the like. The PANs can include wired or wireless networks that support various PAN standards, such as BLUETOOTH, ZIGBEE, and the like. The WANs can include wired or wireless networks that support various WAN standards, such as Code Division Multiple Access (CDMA), Global System for Mobiles (GSM), and the like. The network 418 connects and enables data communication between the computing devices within the location 402A, the monitoring center environment 420, the data center environment 424, and the customer devices 422. In at least some examples, both the monitoring center environment 420 and the data center environment 424 include network equipment (e.g., similar to the router 416) that is configured to communicate with the network 418 and computing devices collocated with or near the network equipment.

Continuing with the example of FIG. 13, the data center environment 424 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 424 can be dedicated to the security system 400, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources.

Regardless of its physical or logical configuration, as shown in FIG. 13, the data center environment 424 is configured to host the surveillance service 428 and the transport services 426.

Continuing with the example of FIG. 13, the monitoring center environment 420 can include a plurality of computing devices (e.g., desktop computers) and network equipment (e.g., one or more routers) connected to the computing devices and the network 418. The customer devices 422 can include personal computing devices (e.g., a desktop computer, laptop, tablet, smartphone, or the like) and network equipment (e.g., a router, cellular modem, cellular radio, or the like). As illustrated in FIG. 13, the monitoring center environment 420 is configured to host the monitor interfaces 430 and the customer devices 422 are configured to host the customer interfaces 432.

Continuing with the example of FIG. 13, the devices 404, 406, 410, and 412 are configured to acquire analog signals via sensors incorporated into the devices, generate digital sensor data based on the acquired signals, and communicate (e.g. via a wireless link with the router 416) the sensor data to the base station 414. The type of sensor data generated and communicated by these devices varies along with the type of sensors included in the devices. For instance, the image capture devices 404 and 410 can acquire ambient light, generate frames of image data based on the acquired light, and communicate the frames to the base station 414, although the pixel resolution and frame rate may vary depending on the capabilities of the devices. In some examples, the image capture devices 404 and 410 can also receive and store filter zone configuration data and filter the frames using one or more filter zones prior to communicating the frames to the base station 414. As shown in FIG. 13, the image capture device 404 has an FOV that originates proximal to a front door of the location 402A and can acquire images of a walkway, highway, and a space between the location 402A and the highway. The image capture device 410 has an FOV that originates proximal to a bathroom of the location 402A and can acquire images of a living room and dining area of the location 402A. The image capture device 410 can further acquire images of outdoor areas beyond the location 402A through windows 417A and 417B on the right side of the location 402A.

Continuing with the example of FIG. 13, the contact sensor assembly 406 includes a sensor that can detect the presence or absence of a magnetic field generated by a magnet when the magnet is proximal to the sensor. When the magnetic field is present, the contact sensor assembly 406 generates Boolean sensor data specifying a closed state. When the magnetic field is absent, the contact sensor assembly 406 generates Boolean sensor data specifying an open state. In either case, the contact sensor assembly 406 can communicate sensor data indicating whether the front door of the location 402A is open or closed to the base station 414. The motion sensor assembly 412 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 412 generates Boolean sensor data specifying a still state. When the audio sensor does not detect a reflection because an object is in motion within the monitored space, the motion sensor assembly 412 generates Boolean sensor data specifying an alert state. In either case, the motion sensor assembly 412 can communicate the sensor data to the base station 414. It should be noted that the specific sensing modalities described above are not limiting to the present disclosure. For instance, as one of many potential examples, the motion sensor assembly 412 can base its operation on acquisition of changes in temperature rather than changes in reflected sound waves.

Continuing with the example of FIG. 13, the keypad 408 is configured to interact with a user and interoperate with the other devices disposed in the location 402A in response to interactions with the user. For instance, in some examples, the keypad 408 is configured to receive input from a user that specifies one or more commands and to communicate the specified commands to one or more addressed devices or processes. These addressed devices or processes can include one or more of the devices disposed in the location 402A and/or one or more of the monitor interfaces 430 or the surveillance service 428. The commands can include, for example, codes that authenticate the user as a resident of the location 402A and/or codes that request activation or deactivation of one or more of the devices disposed in the location 402A. Alternatively or additionally, in some examples, the keypad 408 includes a user interface (e.g., a tactile interface, such as a set of physical buttons or a set of virtual buttons on a touchscreen) configured to interact with a user (e.g., receive input from and/or render output to the user). Further still, in some examples, the keypad 408 can receive responses to the communicated commands and render the responses via the user interface as visual or audio output.

Continuing with the example of FIG. 13, the base station 414 is configured to interoperate with other security system devices disposed at the location 402A to provide local command and control and store-and-forward functionality via execution of the surveillance client 436. In some examples, to implement store-and-forward functionality, the base station 414, through execution of the surveillance client 436, receives sensor data, packages the data for transport, and stores the packaged sensor data in local memory for subsequent communication. This communication of the packaged sensor data can include, for instance, transmission of the packaged sensor data as a payload of a message to one or more of the transport services 426 when a communication link to the transport services 426 via the network 418 is operational. In some examples, packaging the sensor data can include filtering the sensor data using one or more filter zones and/or generating one or more summaries (maximum values, average values, changes in values since the previous communication of the same, etc.) of multiple sensor readings. To implement local command and control functionality, the base station 414 executes a variety of programmatic operations through execution of the surveillance client 436 in response to various events. Examples of these events can include reception of commands from the keypad 408, reception of commands from one of the monitor interfaces 430 or the customer interface application 432 via the network 418, or detection of the occurrence of a scheduled event. The programmatic operations executed by the base station 414 via execution of the surveillance client 436 in response to events can include activation or deactivation of one or more of the devices 404, 406, 408, 410, and 412; sounding of an alarm, e.g., in response to receiving an audio signal; reporting an event to the surveillance service 428; and communicating location data to one or more of the transport services 426 to name a few operations. The location data can include data specifying sensor readings (sensor data), configuration data of any of the devices disposed at the location 402A, commands input and received from a user (e.g., via the keypad 408 or a customer interface 432), or data derived from one or more of these data types (e.g., filtered sensor data, summarizations of sensor data, event data specifying an event detected at the location via the sensor data, etc.).

Continuing with the example of FIG. 13, the transport services 426 are configured to receive messages from monitored locations (e.g., the location 402A), parse the messages to extract payloads included therein, and store the payloads and/or data derived from the payloads within one or more data stores hosted in the data center environment 424. In some examples, the transport services 426 expose and implement one or more application programming interfaces (APIs) that are configured to receive, process, and respond to calls from base stations (e.g., the base station 414) via the network 418. Individual instances of a transport service within the transport services 426 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation and/or extensible markup language. These API calls are addressed to one or more uniform resource locators (URLs) that are API endpoints monitored by the transport services 426. In some examples, portions of the HTTP communications are encrypted to increase security. Alternatively or additionally, in some examples, the API is implemented as a .NET web API that responds to HTTP posts to particular URLs. Alternatively or additionally, in some examples, the API is implemented using simple file transfer protocol commands. Thus, the APIs as described herein are not limited to any particular implementation.

Continuing with the example of FIG. 13, the surveillance service 428 is configured to control overall logical setup and operation of the system 400. As such, the surveillance service 428 can interoperate with the transport services 426, the monitor interfaces 430, the customer interfaces 432, and any of the devices disposed at the location 402A via the network 418. In some examples, the surveillance service 428 is configured to monitor data from a variety of sources for reportable events (e.g., a break-in event) and, when a reportable event is detected, notify one or more of the monitor interfaces 430 and/or the customer interfaces 432 of the reportable event. In some examples, the surveillance service 428 is also configured to maintain state information regarding the location 402A. This state information can indicate, for instance, whether the location 402A is safe or under threat. In certain examples, the surveillance service 428 is configured to change the state information to indicate that the location 402A is safe only upon receipt of a communication indicating a clear event (e.g., rather than making such a change in response to discontinuation of reception of break-in events). This feature can prevent a "crash and smash" robbery from being successfully executed. In addition, in some examples, the surveillance service 428 is configured to setup and utilize zones. Such setup of the zones can include interacting with monitoring personnel via the monitor interfaces 430, interacting with a customer via a customer interface 432, and/or executing autonomous zone recommendation processes as described herein.

Continuing with the example of FIG. 13, individual monitor interfaces 430 are configured to control computing device interaction with monitoring personnel and to execute a variety of programmatic operations in response to the interactions. For instance, in some examples, the monitor interface 430 controls its host device to provide information regarding reportable events detected at monitored locations, such as the location 402A, to monitoring personnel. Such events can include, for example, movement within an intruder zone or outside a filter zone. Alternatively or additionally, in some examples, the monitor interface 430 controls its host device to interact with a user to configure features of the system 400, such as one or more monitor zones.

Continuing with the example of FIG. 13, individual customer interfaces 432 are configured to control computing device interaction with a customer and to execute a variety of programmatic operations in response to the interactions. For instance, in some examples, the customer interface 432 controls its host device to provide information regarding reportable events detected at monitored locations, such as the location 402A, to the customer. Such events can include, for example, movement within an intruder zone or outside a filter zone. Alternatively or additionally, in some examples, the customer interface 432 is configured to process input received from the customer to activate or deactivate one or more of the devices disposed within the location 402A. Further still, in some examples, the customer interface 432 configures features of the system 400, such as one or more customer zones, in response to input from a user.

Figure 14:
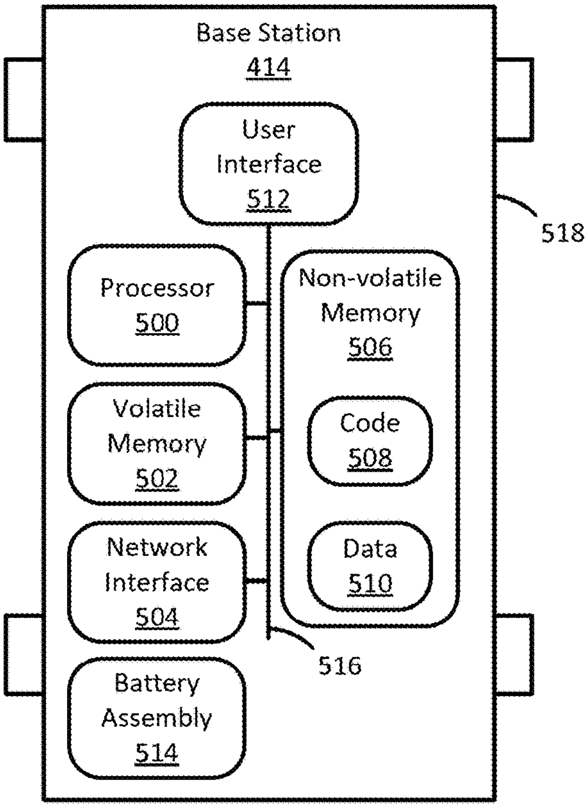
FIG. 14 is a schematic diagram of a base station, according to some examples described herein.

Turning now to FIG. 14, an example base station 414 is schematically illustrated. A device 10, 110 in accordance with the present disclosure may comprise or be included as part of the base station 414. As shown in FIG. 14, the base station 414 includes at least one processor 500, volatile memory 502, non-volatile memory 506, at least one network interface 504, a user interface 512, a battery 514, and an interconnection mechanism 516. The non-volatile memory 506 stores executable code 508 and includes a data store 510. In some examples illustrated by FIG. 14, the features of the base station 414 enumerated above are incorporated within, or are a part of, a housing 518.

In some examples, the non-volatile (non-transitory) memory 506 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 508 stored in the non-volatile memory can include an operating system and one or more applications or programs that are configured to execute under the operating system. Alternatively or additionally, the code 508 can include specialized firmware and embedded software that is executable without dependence upon a commercially available operating system. Regardless, execution of the code 508 can implement the surveillance client 436 of FIG. 13 and can result in manipulated data that is a part of the data store 510.

Continuing the example of FIG. 14, the processor 500 can include one or more programmable processors to execute one or more executable instructions, such as a computer program specified by the code 508, to control the operations of the base station 414. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 502) and executed by the circuitry. In some examples, the processor 500 is a digital processor, but the processor 500 can be analog, digital, or mixed. As such, the processor 500 can execute the function, operation, or sequence of operations using digital values and/or using analog signals. In some examples, the processor 500 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 500 that are multicore can provide functionality for parallel, simultaneous execution of instructions or for parallel, simultaneous execution of one instruction on more than one piece of data.

Continuing with the example of FIG. 14, prior to execution of the code 508 the processor 500 can copy the code 508 from the non-volatile memory 506 to the volatile memory 502. In some examples, the volatile memory 502 includes one or more static or dynamic random access memory (RAM) chips and/or cache memory (e.g. memory disposed on a silicon die of the processor 500). Volatile memory 502 can offer a faster response time than a main memory, such as the non-volatile memory 506.

Through execution of the code 508, the processor 500 can control operation of the network interface 504. For instance, in some examples, the network interface 504 includes one or more physical interfaces (e.g., a radio, an ethernet port, a universal serial bus (USB) port, etc.) and a software stack including drivers and/or other code 508 that is configured to communicate with the one or more physical interfaces to support one or more LAN, PAN, and/or WAN standard communication protocols. The communication protocols can include, for example, transmission control protocol (TCP) and user datagram protocol (UDP) among others. As such, the network interface 504 enables the base station 414 to access and communicate with other computing devices (e.g., the other devices disposed in the location 402A of FIG. 13) via a computer network (e.g., the LAN established by the router 416 of FIG. 13, the network 418 of FIG. 13, and/or a point-to-point connection). For instance, in at least one example, the network interface 504 utilizes sub-GHz wireless networking to transmit wake messages to the other computing devices to request streams of sensor data.

Through execution of the code 508, the processor 500 can control operation of hardware and a software stack including drivers and/or other code 508 that is configured to communicate with other system devices. As such, the base station 414 interacts with other system components in response to received inputs. The input can specify values to be stored in the data store 510. The output can indicate values stored in the data store 510. It should be noted that, in some examples, the base station 414 may include one or more light-emitting diodes (LEDs) to visually communicate information, such as system status or alarm events. Alternatively or additionally, in some examples, the base station 414 includes a 95 db siren that the processor 500 sounds to indicate that a break-in event has been detected.

Continuing with the example of FIG. 14, the various features of the base station 414 described above can communicate with one another via the interconnection mechanism 516. In some examples, the interconnection mechanism 516 includes a communications bus. In addition, in some examples, the battery assembly 514 is configured to supply operational power to the various features of the base station 414 described above. In some examples, the battery assembly 514 includes at least one rechargeable battery (e.g., one or more NiMH or lithium batteries). In some examples, the rechargeable battery has a runtime capacity sufficient to operate the base station 414 for 24 hours or longer while the base station 414 is disconnected from or otherwise not receiving line power. Alternatively or additionally, in some examples, the battery assembly 514 includes power supply circuitry to receive, condition, and distribute line power to both operate the base station 414 and recharge the rechargeable battery. The power supply circuitry can include, for example, a transformer and a rectifier, among other circuitry, to convert AC line power to DC device and recharging power.

Figure 15:
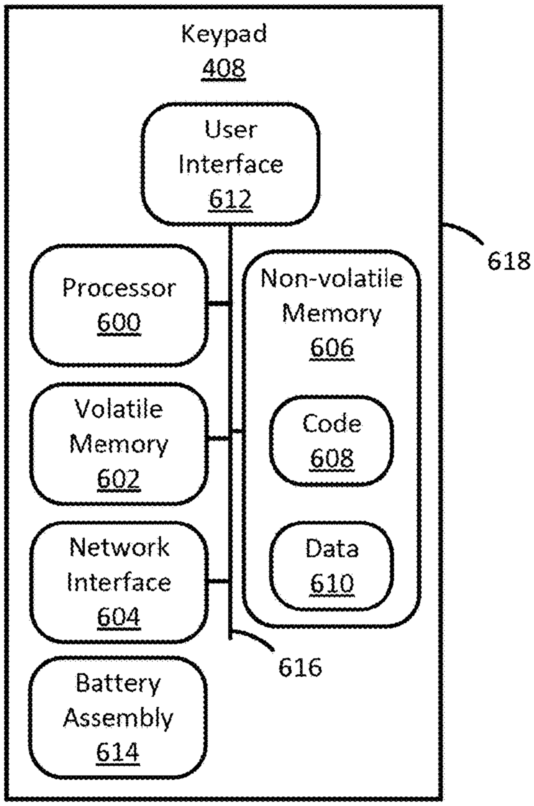
FIG. 15 is a schematic diagram of a keypad, according to some examples described herein.

Turning now to FIG. 15, an example keypad 408 is schematically illustrated. As shown in FIG. 15, the keypad 408 includes at least one processor 600, volatile memory 602, non-volatile memory 606, at least one network interface 604, a user interface 612, a battery assembly 614, and an interconnection mechanism 616. The non-volatile memory 606 stores executable code 608 and data store 610. In some examples illustrated by FIG. 15, the features of the keypad 408 enumerated above are incorporated within, or are a part of, a housing 618.

In some examples, the respective descriptions of the processor 500, the volatile memory 502, the non-volatile memory 506, the interconnection mechanism 516, and the battery assembly 514 with reference to the base station 414 are applicable to the processor 600, the volatile memory 602, the non-volatile memory 606, the interconnection mechanism 616, and the battery assembly 614 with reference to the keypad 408. As such, those descriptions will not be repeated here.

Continuing with the example of FIG. 15, through execution of the code 608, the processor 600 can control operation of the network interface 604. In some examples, the network interface 604 includes one or more physical interfaces (e.g., a radio, an ethernet port, a USB port, etc.) and a software stack including drivers and/or other code 608 that is configured to communicate with the one or more physical interfaces to support one or more LAN, PAN, and/or WAN standard communication protocols. These communication protocols can include, for example, TCP and UDP, among others. As such, the network interface 604 enables the keypad 408 to access and communicate with other computing devices (e.g., the other devices disposed in the location 402A of FIG. 13) via a computer network (e.g., the LAN established by the router 416).

Continuing with the example of FIG. 15, through execution of the code 608, the processor 600 can control operation of the user interface 612. In some examples, the user interface 612 includes user input and/or output devices (e.g., physical keys arranged as a keypad, a touchscreen, a display, a speaker, a camera, a biometric scanner, an environmental sensor, etc.) and a software stack including drivers and/or other code 608 that is configured to communicate with the user input and/or output devices. As such, the user interface 612 enables the keypad 408 to interact with users to receive input and/or render output. This rendered output can include, for instance, one or more GUIs including one or more controls configured to display output and/or receive input. The input can specify values to be stored in the data store 610. The output can indicate values stored in the data store 610. It should be noted that, in some examples, parts of the user interface 612 (e.g., one or more LEDs) are accessible and/or visible as part of, or through, the housing 618.

Figure 16:
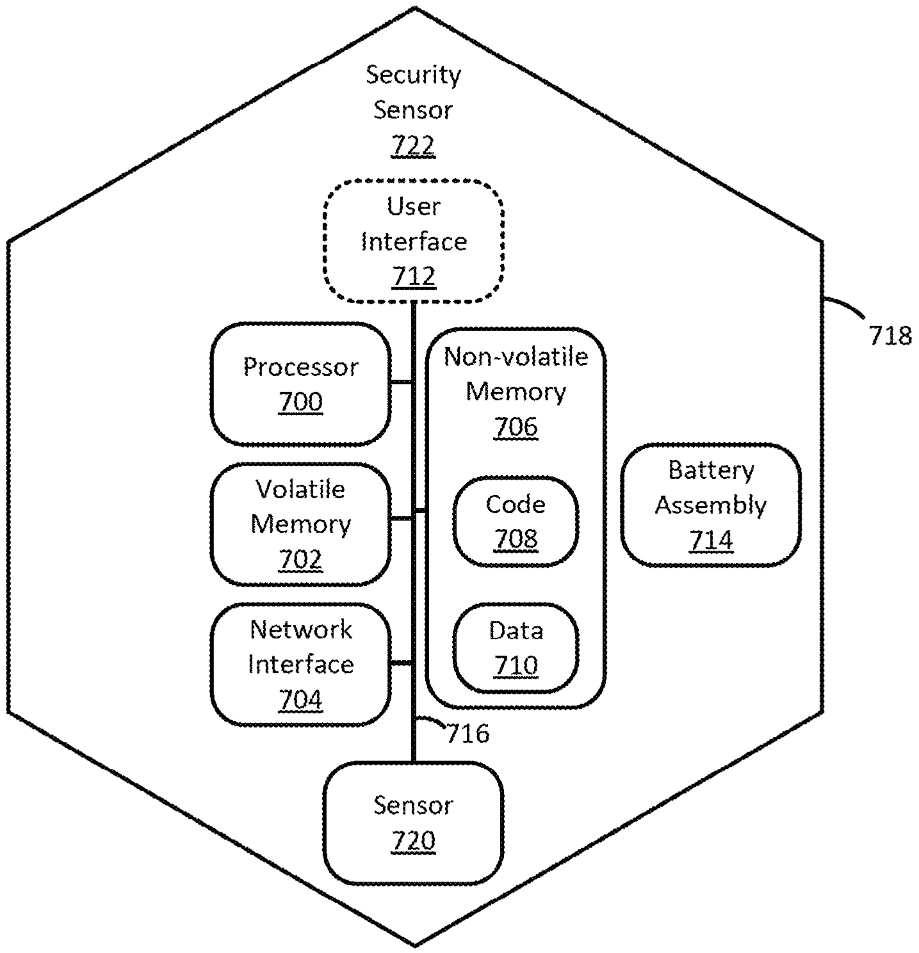
FIG. 16 is a schematic diagram of a security sensor, according to some examples described herein.

Turning now to FIG. 16, an example security sensor assembly 722 is schematically illustrated. Particular configurations of the security sensor assembly 722 (e.g., the image capture devices 404 and 410, the motion sensor assembly 412, and the contact sensor assemblies 406) are illustrated in FIG. 13 and described above. As shown in FIG. 16, the sensor assembly 722 includes at least one processor 700, volatile memory 702, non-volatile memory 706, at least one network interface 704, a battery assembly 714, an interconnection mechanism 716, and at least one sensor 720. The non-volatile memory 706 stores executable code 708 and data store 710. Some examples include a user interface 712. In certain examples illustrated by FIG. 16, the features of the sensor assembly 722 enumerated above are incorporated within, or are a part of, a housing 718.

In some examples, the respective descriptions of the processor 500, the volatile memory 502, the non-volatile memory 506, the interconnection mechanism 516, and the battery assembly 514 with reference to the base station 414 are applicable to the processor 700, the volatile memory 702, the non-volatile memory 706, the interconnection mechanism 716, and the battery assembly 714 with reference to the sensor assembly 722. As such, those descriptions will not be repeated here.

Continuing with the example of FIG. 16, through execution of the code 708, the processor 700 can control operation of the network interface 704 and the user interface 712. In some examples, the network interface 704 includes one or more physical interfaces (e.g., a radio, an ethernet port, a USB port, etc.) and a software stack including drivers and/or other code 708 that is configured to communicate with the one or more physical interfaces to support one or more LAN, PAN, and/or WAN standard communication protocols. The communication protocols can include, for example, TCP and UDP, among others. As such, the network interface 704 enables the sensor assembly 722 to access and communicate with other computing devices (e.g., the other devices disposed in the location 402A of FIG. 13) via a computer network (e.g., the LAN established by the router 416). For instance, in at least one example, when executing the code 708, the processor 700 controls the network interface to stream (e.g., via UDP) sensor data acquired from the sensor assembly 720 to the base station 414. Alternatively or additionally, in at least one example, through execution of the code 708, the processor 700 can control the network interface 704 to enter a power conservation mode by powering down a 2.4 GHz radio and powering up a sub-GHz radio that are both included in the network interface 704. In this example, through execution of the code 708, the processor 700 can control the network interface 704 to enter a streaming mode by powering up a 2.4 GHz radio and powering down a sub-GHz radio, for example, in response to receiving a wake signal from the base station via the sub-GHz radio.

Continuing with the example of FIG. 16, through execution of the code 708, the processor 700 can control operation of the sensor assembly 722. In some examples, the sensor assembly 722 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 708 that is configured to communicate with the user input and/or output devices. As such, the sensor assembly 722 enables the sensor assembly 722 to interact with users to receive input and/or render output. This rendered output can include, for instance, one or more GUIs including one or more controls configured to display output and/or receive input. The input can specify values to be stored in the data store 710. The output can indicate values stored in the data store 710. It should be noted that, in some examples, parts of sensor assembly 722 are accessible and/or visible as part of, or through, the housing 718.

Continuing with the example of FIG. 16, the sensor assembly 720 can include one or more types of sensors, such as the sensors described above with reference to the image capture devices 404 and 410, the motion sensor assembly 412, and the contact sensor assembly 406 of FIG. 13, or other types of sensors. For instance, in at least one example, the sensor assembly 720 includes an image capture device and a temperature sensor. Regardless of the type of sensor or sensors housed, the processor 700 can (e.g., via execution of the code 708) acquire sensor data from the housed sensor and stream the acquired sensor data to the processor 700 for communication to the base station.

It should be noted that, in some examples of the devices 600 and 700, the operations executed by the processors 600 and 700 while under control of respective control of the code 608 and 708 may be hardcoded and/or implemented in hardware, rather than as a combination of hardware and software.

Figure 17:
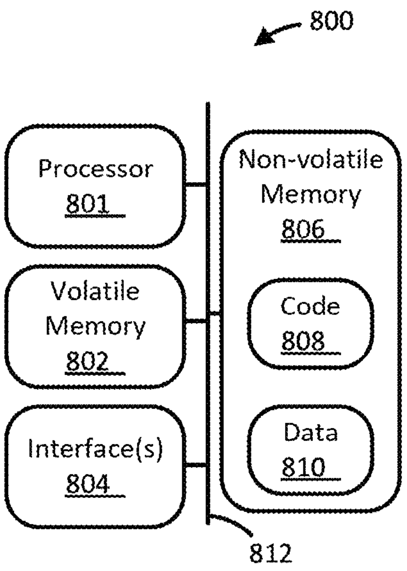
FIG. 17 is a schematic diagram of a computing device, according to some examples described herein.

Turning now to FIG. 17, a computing device 800 is illustrated schematically. As shown in FIG. 17, the computing device includes at least one processor 801, volatile memory 802, one or more interfaces 804, non-volatile memory 806, and an interconnection mechanism 812. The non-volatile memory 806 includes code 808 and at least one data store 810.

In some examples, the non-volatile (non-transitory) memory 806 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 808 stored in the non-volatile memory can include an operating system and one or more applications or programs that are configured to execute under the operating system. Alternatively or additionally, the code 808 can include specialized firmware and embedded software that is executable without dependence upon a commercially available operating system. Regardless, execution of the code 808 can result in manipulated data that may be stored in the data store 810 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 17, the processor 801 can be one or more programmable processors to execute one or more executable instructions, such as a computer program specified by the code 808, to control the operations of the computing device 800. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 802) and executed by the circuitry. In some examples, the processor 801 is a digital processor, but the processor 801 can be analog, digital, or mixed. As such, the processor 801 can execute the function, operation, or sequence of operations using digital values and/or using analog signals. In some examples, the processor 801 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 801 that are multicore can provide functionality for parallel, simultaneous execution of instructions or for parallel, simultaneous execution of one instruction on more than one piece of data.

Continuing with the example of FIG. 17, prior to execution of the code 808 the processor 801 can copy the code 808 from the non-volatile memory 806 to the volatile memory 802. In some examples, the volatile memory 802 includes one or more static or dynamic random access memory (RAM) chips and/or cache memory (e.g. memory disposed on a silicon die of the processor 801). Volatile memory 802 can offer a faster response time than a main memory, such as the non-volatile memory 806.

Through execution of the code 808, the processor 801 can control operation of the interfaces 804. The interfaces 804 can include network interfaces. These network interfaces can include one or more physical interfaces (e.g., a radio, an ethernet port, a USB port, etc.) and a software stack including drivers and/or other code 808 that is configured to communicate with the one or more physical interfaces to support one or more LAN, PAN, and/or WAN standard communication protocols. The communication protocols can include, for example, TCP and UDP among others. As such, the network interfaces enable the computing device 801 to access and communicate with other computing devices via a computer network.

The interfaces 804 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 808 that is configured to communicate with the user input and/or output devices. As such, the user interfaces enable the computing device 801 to interact with users to receive input and/or render output. This rendered output can include, for instance, one or more GUIs including one or more controls configured to display output and/or receive input. The input can specify values to be stored in the data store 810. The output can indicate values stored in the data store 810.

Continuing with the example of FIG. 17, the various features of the computing device 800 described above can communicate with one another via the interconnection mechanism 812. In some examples, the interconnection mechanism 812 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing,"

"involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A device comprising:

a speaker configured to output sound in the form of speech and an alarm tone, the speaker capable of generating an output within a frequency range of from 400 Hz to 4.0 kHz; and a housing enclosing the speaker and including a plurality of openings within one portion of the housing, the speaker being positioned within the housing to define a front chamber between a diaphragm of the speaker and the one portion, the front chamber and the plurality of openings being arranged to create a resonator having a resonance frequency within a frequency range of the alarm tone to selectively increase a sound pressure level of a given output that includes the alarm tone, the increase being at least 6 dB and within a frequency range of 2.5 kHz to 2.7 kHz, the given output includes a peak in frequency amplitude falling within the frequency range of 2.5 kHz to 2.7 kHz.

2. The device of claim 1, wherein the speaker comprises an electrodynamic speaker.

3. The device of claim 1, wherein the output of the speaker comprises a peak output of the device within the frequency range of the output of the speaker corresponding to the alarm tone.

4. The device of claim 1, wherein the one portion of the housing comprises a first end of the housing and wherein the front chamber comprises the plurality of openings within the one end of the housing but is otherwise acoustically sealed.

5. The device of claim 1, wherein the speaker comprises a security alarm speaker.

6. A method for assembling a device, the method comprising:

providing a speaker and a housing, the speaker configured to output sound in the form of speech and an alarm tone, and the housing comprising a plurality of openings within one portion, wherein the speaker is capable of generating an output within a frequency range of from 400 Hz to 4.0 kHz;

assembling the housing and the speaker to form the device such that the housing encloses the speaker and the speaker is positioned within the housing to define a front chamber between a diaphragm of the speaker and the one portion; and arranging the front chamber and the plurality of openings to create a resonator having a resonance frequency within a frequency range of the alarm tone to selectively increase a sound pressure level of a given output that includes the alarm tone, the increase being at least 6 dB and within a frequency range of 2.5 kHz to 2.7 kHz, the given output includes a peak in frequency amplitude falling within the frequency range of 2.5 kHz to 2.7 kHz.

7. The method of claim 6, wherein the speaker comprises an electrodynamic speaker.

8. The method of claim 6, wherein the output of the speaker comprises a peak output of the device within the frequency range of the output of the speaker corresponding to the alarm tone.

9. The method of claim 6, further comprising:

acoustically sealing the front chamber such that acoustic waves generated by the speaker are directed only through the plurality of openings.

10. A method comprising:

providing a speaker including a diaphragm, the speaker being capable of generating an output in the form of speech and an alarm tone within a frequency range of from 400 Hz to 4.0 kHz;

providing a housing for enclosing the speaker and including a plurality of openings within one portion of the housing;

positioning the speaker within the housing to define a front chamber between the diaphragm and the one portion, the speaker and the housing defining a device, and the front chamber including the plurality of openings within the one portion of the housing but is otherwise acoustically sealed; and defining one or more parameters of the device to collectively create a resonator having a resonance frequency matching at least a portion of a frequency range of the output of the speaker corresponding to an alarm tone, the resonator selectively increasing a sound pressure level of a given output that includes the alarm tone, the increase being at least 6 dB and within a frequency range of 2.5 kHz to 2.7 kHz, the given output includes a peak in frequency amplitude falling within the frequency range of 2.5 kHz to 2.7 kHz.

11. The method of claim 10, wherein the speaker comprises an electrodynamic speaker.

12. The method of claim 10, wherein the one or more parameters comprise a volume of the front chamber, the method further comprising:

increasing the volume of the front chamber when the resonance frequency is to be decreased; and decreasing the volume of the front chamber when the resonance frequency is to be increased.

13. The method of claim 10, wherein the one or more parameters comprise a cross-sectional area of each of the openings, the method further comprising:

decreasing the cross-sectional area of the openings when the resonance frequency is to be decreased; and increasing the cross-sectional area of the openings when the resonance frequency is to be increased.

* * * * *